US012806994B2

(12) United States Patent
Fujino et al.

(10) Patent No.: US 12,806,994 B2
(45) Date of Patent: Nov. 24, 2026

(54) VEHICLE DISPLAY APPARATUS

(71) Applicant: DENSO CORPORATION, Kariya-city (JP)

(72) Inventors: Takahisa Fujino, Kariya-city (JP); Tatsuya Okuno, Kariya-city (JP); Toshiharu Shiratsuchi, Kariya-city (JP); Shiori Maneyama, Kariya-city (JP); Kazuki Izumi, Kariya-city (JP); Takuya Kume, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 244 days.

(21) Appl. No.: 18/165,228

(22) Filed: Feb. 6, 2023

(65) Prior Publication Data

US 2023/0182572 A1 Jun. 15, 2023

Related U.S. Application Data

(63) Continuation of application No. PCT/JP2021/027436, filed on Jul. 23, 2021.

(30) Foreign Application Priority Data

Aug. 21, 2020 (JP) ................................ 2020-140154
Jul. 21, 2021 (JP) ................................ 2021-120890

(51) Int. Cl.
*B60K 35/22* (2024.01)
*B60K 35/00* (2006.01)
(Continued)

(52) U.S. Cl.
CPC .............. *B60K 35/00* (2013.01); *B60K 35/10* (2024.01); *B60K 35/215* (2024.01); *B60K 35/22* (2024.01);
(Continued)

(58) Field of Classification Search
CPC .. B60K 35/22; B60K 35/28; B60K 2360/175; B60K 2360/176; B60W 40/04;
(Continued)

(56) References Cited

U.S. PATENT DOCUMENTS

2007/0273555 A1 11/2007 Amano
2012/0277947 A1 11/2012 Boehringer et al.
(Continued)

FOREIGN PATENT DOCUMENTS

JP 2005324661 A 11/2005
JP 2006111170 A 4/2006
(Continued)

OTHER PUBLICATIONS

U.S. Appl. No. 19/199,836, filed May 6, 2025, Fujino et al.

*Primary Examiner* — Amelia Vorce
*Assistant Examiner* — Alex B Griffin
(74) *Attorney, Agent, or Firm* — Harness, Dickey & Pierce, P.L.C.

(57) ABSTRACT

A vehicle display apparatus includes: a display that displays traveling information of a vehicle; an acquisition unit that acquires position information of the vehicle and traffic congestion information of an other vehicle that travels in a periphery of the vehicle; and a display controller that detects an occurrence of a traffic congestion from the position information and the traffic congestion information, and upon detecting the occurrence, displays, on the display, transition
(Continued)

information related to transition to autonomous driving by using an image of at least one of a traveling road, the other vehicle, or the vehicle.

6 Claims, 26 Drawing Sheets

(51) Int. Cl.

| | |
|---|---|
| ***B60K 35/10*** | (2024.01) |
| ***B60K 35/215*** | (2024.01) |
| ***B60K 35/23*** | (2024.01) |
| ***B60K 35/26*** | (2024.01) |
| ***B60K 35/28*** | (2024.01) |
| ***B60K 35/29*** | (2024.01) |
| ***B60K 35/81*** | (2024.01) |
| ***B60W 40/04*** | (2006.01) |
| ***B60W 60/00*** | (2020.01) |
| *B60W 50/14* | (2020.01) |

(52) U.S. Cl.
CPC .............. *B60K 35/23* (2024.01); *B60K 35/26* (2024.01); *B60K 35/28* (2024.01); *B60K 35/29* (2024.01); *B60K 35/81* (2024.01); *B60W 40/04* (2013.01); *B60W 60/0059* (2020.02); *B60K 2360/175* (2024.01); *B60K 2360/176* (2024.01); *B60W 50/14* (2013.01); *B60W 2554/4041* (2020.02)

(58) Field of Classification Search
CPC ........... B60W 50/14; B60W 2050/146; B60W 2554/4041; B60W 2554/406
See application file for complete search history.

(56) References Cited

U.S. PATENT DOCUMENTS

| | | | | |
|---|---|---|---|---|
| 2014/0330478 | A1* | 11/2014 | Cullinane | B60R 16/023 701/23 |
| 2017/0212525 | A1* | 7/2017 | Wang | B60W 40/08 |
| 2019/0039618 | A1 | 2/2019 | Mori | |
| 2020/0393847 | A1* | 12/2020 | Govindan | G05D 1/0295 |
| 2022/0315027 | A1* | 10/2022 | Behring | B60K 35/00 |
| 2023/0182572 | A1 | 6/2023 | Fujino et al. | |

FOREIGN PATENT DOCUMENTS

| | | | | |
|---|---|---|---|---|
| JP | 2010228471 | A | | 10/2010 |
| JP | 2017182586 | A | * | 10/2017 |
| JP | 2019006280 | A | | 1/2019 |
| JP | 2022-36003 | A | | 3/2022 |
| WO | WO-2006001414 | A1 | | 1/2006 |
| WO | WO-2017154396 | A1 | | 9/2017 |

* cited by examiner (a)

(b)

VEHICLE DISPLAY APPARATUS

CROSS REFERENCE TO RELATED APPLICATIONS

The present application is a continuation application of International Patent Application No. PCT/JP2021/027436 filed on Jul. 23, 2021, which designated the U.S. and claims the benefit of priority from Japanese Patent Application No. 2020-140154 filed on Aug. 21, 2020 and the benefit of priority from Japanese Patent Application No. 2021-120890 filed on Jul. 21, 2021. The entire disclosures of all of the above applications are incorporated herein by reference.

TECHNICAL FIELD

The present disclosure relates to a vehicle display apparatus and a vehicle display method for a vehicle having an autonomous driving function.

BACKGROUND

For example, a vehicle control apparatus has been known as a comparative example. In the comparative example, the vehicle control apparatus determines that transition to an autonomous driving is possible and starts the autonomous driving, for example, when it is determined that a traffic congestion occurred based on traffic congestion information provided from a system such as a VICS (vehicle information and communication system, registered trademark) during a highway traveling, a traffic congestion section is equal to or higher than a predetermined distance, and also a vehicle speed is equal to or smaller than a predetermined value. The autonomous driving is, for example, driving that keeps a constant distance from a congested forwarding vehicle and follows the vehicle. Then, after the autonomous driving started, when an autonomous driving stop condition is satisfied, the autonomous driving stops.

SUMMARY

A vehicle display apparatus includes: a display that displays traveling information of a vehicle; an acquisition unit that acquires position information of the vehicle and traffic congestion information of an other vehicle that travels in a periphery of the vehicle; and a display controller that detects an occurrence of a traffic congestion from the position information and the traffic congestion information, and upon detecting the occurrence, displays, on the display, transition information related to transition to autonomous driving by using an image of at least one of a traveling road, the other vehicle, or the vehicle.

DETAILED DESCRIPTION

Figure 1:
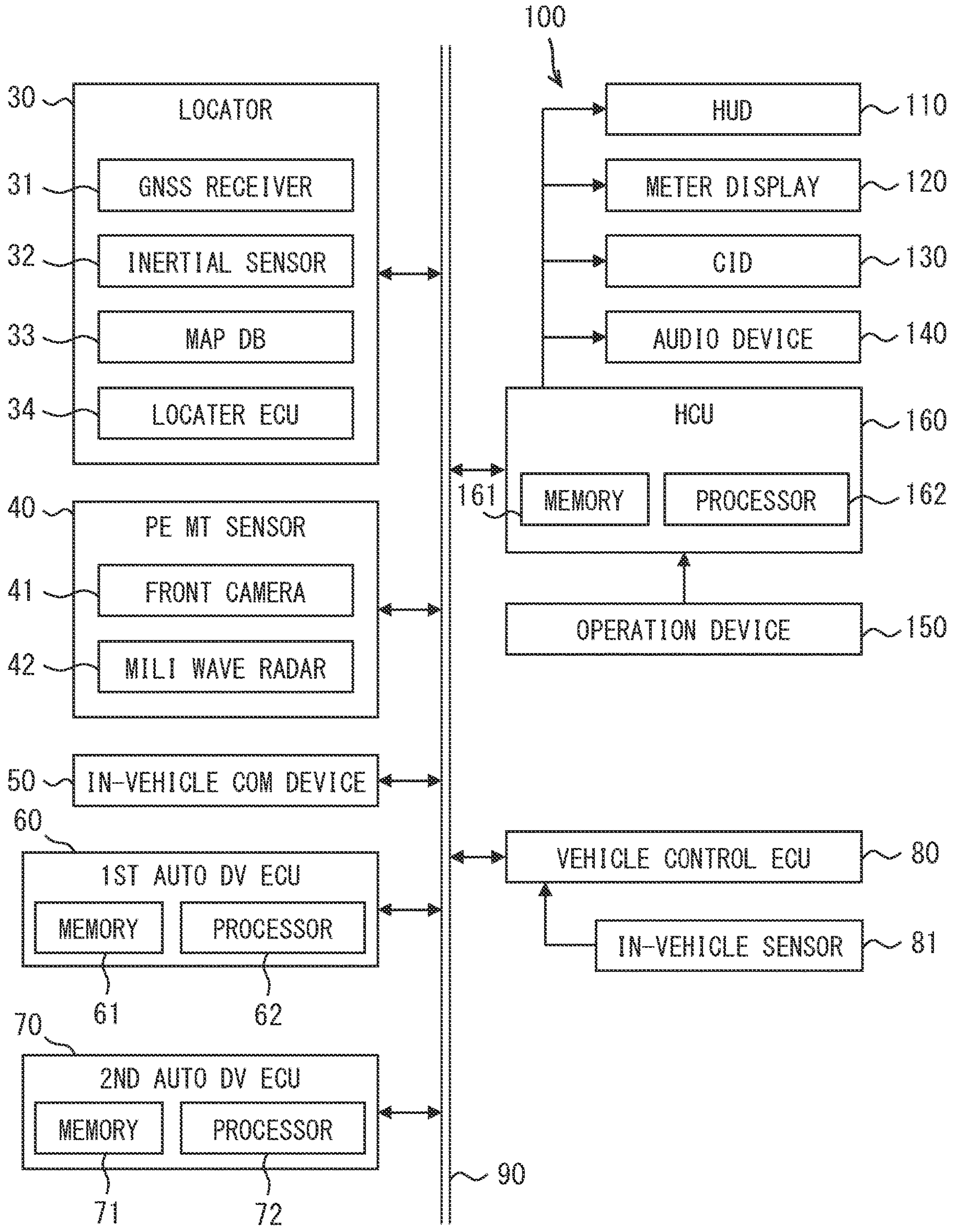
FIG. 1 is a block diagram showing an overall configuration of a vehicle display apparatus.

A driver does not always understand accurately a determination condition (in the above comparative example, VICS information, the traffic congestion section, the vehicle speed, or the like) used for the vehicle control device to determine the traffic congestion occurrence. Accordingly, even if the driver sensuously thinks that the vehicle entered the traffic congestion, the vehicle control device does not change the driving state to the autonomous driving due to the traffic congestion since the determination condition is not satisfied. Therefore, there is a possibility that the driver feels uncomfortable.

The present disclosure provides a vehicle display apparatus that informs a user of a traffic congestion situation until an autonomous driving possible condition is satisfied.

According to one example, a vehicle display apparatus includes: a display that displays traveling information of a vehicle; an acquisition unit that acquires position information of the vehicle and traffic congestion information of an other vehicle that travels in a periphery of the vehicle; and a display controller that detects an occurrence of a traffic congestion from the position information and the traffic congestion information, and upon detecting the occurrence, displays, on the display, transition information related to transition to autonomous driving by using an image of at least one of a traveling road, the other vehicle, or the vehicle, until a predetermined autonomous driving possible condition of the vehicle during the traffic congestion is satisfied. The display controller may display, as the transition information, a predetermined other vehicle area in the periphery of the vehicle, and determine whether the autonomous driving is possible when the other vehicle enters the other vehicle area. Alternatively, the display controller may display, as the transition information, the multiple other vehicles that form the traffic congestion and exclude an other vehicle on a tail, as a cluster. Alternatively, the display controller may display, as the transition information, an impossible area where the autonomous driving is impossible.

According to the configuration, since the driver can clearly recognize a current resolved state of the traffic congestion based on the transition information by the display, it may be possible to grasp whether transition to the first autonomous driving is possible.

According to another example, a vehicle display device includes: a display that displays traveling information of a vehicle; an acquisition unit that acquires position information of the vehicle and traffic congestion information of an other vehicle that travels in a periphery of the vehicle; and a display controller that detects a traffic congestion resolved possibility from the position information and the traffic congestion information, and upon detecting the traffic congestion resolved possibility, displays, on the display, transition information by using an image of at least one of a traveling road, the other vehicle, or the vehicle, until a predetermined autonomous driving resolved condition of the vehicle during a traffic congestion is satisfied, The transition information is related to transition from second autonomous driving to first autonomous driving. The second autonomous driving does not require a periphery monitoring duty and is autonomous driving at an autonomous driving level 3 or higher. The first autonomous driving requires manual driving or the periphery monitoring duty and is autonomous driving at an autonomous driving level 2 or lower. The display controller may display only a subject vehicle lane during the traffic congestion, and perform switching to a display including a peripheral vehicle lane as the transition information when the traffic congestion is resolved. Alternatively, when the traffic congestion is resolved and a new traffic congestion different from the resolved traffic congestion occurs, the display controller may display that the new traffic congestion is different from the resolved traffic congestion. Alternatively, the display controller may change a content of the transition information, depending on a case where the second autonomous driving is at the autonomous driving level 3 or higher due to the traffic congestion or a case where the second autonomous driving is at the autonomous driving level 3 or higher due to the traffic congestion in a predetermined road. Alternatively, the display controller may alternately switch between, as the transition information, a display showing the vehicle in a bird's-eye view form and a display showing the vehicle in a planer form in which the vehicle is seen from directly above the vehicle.

According to the configuration, since the driver can clearly recognize a current resolved state of the traffic congestion based on the transition information by the display, it may be possible to grasp whether the transition to the first autonomous driving is possible.

The following will describe embodiments for carrying out the present disclosure with reference to the drawings. In each embodiment, parts corresponding to the elements described in the preceding embodiments are denoted by the same reference numerals, and redundant explanation may be omitted. When only a part of a configuration is described in an embodiment, another preceding embodiment may be applied to the other parts of the configuration. Not only parts which are specifically clarified so as to be combined in each embodiment are capable of being combined, but also embodiments are capable of being partially combined with each other even though combination is not clarified as long as no adverse effect is particularly generated with respect to the combination.

First Embodiment

A vehicle display apparatus 100 according to a first embodiment will be described with reference to FIGS. 1 to 4. The vehicle display apparatus 100 according to the first embodiment is mounted on (applied to) a vehicle 10 having an autonomous driving function during a traffic congestion. Hereinafter, the vehicle display apparatus 100 will be referred to as a display apparatus 100.

The display apparatus 100 includes a HCU (human machine interface control unit) 160, as shown in FIG. 1. The display apparatus 100 displays, on display units (multiple display devices described later), vehicle traveling information such as, for example, a vehicle speed, an engine speed, a shift position of a transmission, and, navigation information by a navigation system (here, locator 30). Further, the display apparatus 100 displays information related to the autonomous driving on the display unit.

The display apparatus 100 is connected to the locator 30 mounted on a vehicle 10, a periphery monitoring sensor 40, an in-vehicle communication device 50, a first autonomous driving ECU 60, a second autonomous driving ECU 70, and a vehicle control ECU 80 via a communication bus 90 or the like. In the drawings, the periphery monitoring sensor 40 may be also referred to as PE MT sensor. In the drawings, the first autonomous driving ECU 60 may be also referred to as "1ST AUTO DV ECU", and the second autonomous driving ECU 70 may be also referred to as "2ND AUTO DV ECU".

The locator 30 forms the navigation system, and generates subject vehicle position information and the like by complex positioning that combines multiple acquired information. The locator 30 includes a GNSS (Global Navigation Satellite System) receiver 31, an inertial sensor 32, and a map database (hereinafter, map DB) 33, and a locator ECU 34 and the like. The locator 30 corresponds to an acquisition unit of the present disclosure.

The GNSS receiver 31 receives positioning signals from multiple positioning satellites.

The inertial sensor 32 is a sensor that detects the inertial force acting on the vehicle 10. The inertial sensor 32 includes a gyro sensor and an acceleration sensor, for example.

The map DB 33 is a nonvolatile memory, and stores map data such as link data, node data, road shape, structures and the like. The map data may include a three-dimensional map including feature points of road shapes and structures. The three-dimensional map may be generated by REM (road experience management) based on captured images. Further, the map data may include traffic regulation information, road construction information, meteorological information, signal information and the like. The map data stored in the map DB 33 updates regularly or at any time based on the latest information received by the in-vehicle communication device 50 described later.

The locator ECU 34 mainly includes a microcomputer equipped with a processor, a memory, an input/output interface, and a bus connecting these elements. The locator ECU 34 combines the positioning signals received by the GNSS receiver 31, the measurement results of the inertial sensor 32, and the map data of the map DB 33 to sequentially detect the vehicle position (hereinafter, subject vehicle position) of the vehicle 10.

The subject vehicle position may include, for example, coordinates of latitude and longitude. It should be noted that the position of the subject vehicle may be determined using a traveling distance obtained from the signals sequentially output from an in-vehicle sensor 81 (vehicle speed sensor or the like) mounted on the vehicle 10. When a three-dimensional map provided by a road shape and a point group of feature points of a structure is used as map data, the locator ECU 34 may specify the position of the subject vehicle by using the three-dimensional map and the detection results of the periphery monitoring sensor 40 without using the GNSS receiver 31.

The periphery monitoring sensor 40 is an autonomous sensor that monitors a periphery environment of the subject vehicle 10. The periphery monitoring sensor 40 can detect moving objects and stationary objects in a detection range of a periphery of the subject vehicle 10. The moving objects may include pedestrians, cyclists, non-human animals, and other vehicles 20, and the stationary objects may include falling objects on the road, guardrails, curbs, road signs, lane markings, road markings such as a center divider, and structures beside the road. The periphery monitoring sensor 40 provides detection information of detecting an object in the periphery of the vehicle 10 to the first autonomous driving ECU 60, the second autonomous driving ECU 70, and the like through the communication bus 90. The periphery monitoring sensor 40 includes, for example, a front camera 41, a millimeter wave radar 42, and the like as detection configurations for object detection. The periphery monitoring sensor 40 corresponds to the acquisition unit of the present disclosure. The other vehicles 20 may be also referred to as different vehicles 20.

The front camera 41 outputs, as detection information, at least one of image data obtained by capturing a front range of the vehicle 10 or an analysis result of the image data.

The multiple millimeter wave radars 42 are arranged, for example, on front and rear bumpers of the vehicle 10 at intervals from one another. The millimeter wave radars 42 emit millimeter waves or quasi-millimeter waves toward the front range, a front side range, a rear range, and a rear side range of the vehicle 10. Each millimeter wave radar 42 generates detection information by a process of receiving millimeter waves reflected by moving objects, stationary objects, or the like. In the drawings, the millimeter wave radar 42 may be also referred to as MILI WAVE RADAR. The periphery monitoring sensor 40 may include other detection configurations such as LiDAR (light detection and ranging/laser imaging detection and ranging) that detects a point group of feature points of a construction, and a sonar that receives reflected waves of ultrasonic waves.

The in-vehicle communication device 50 is a communication module mounted on the vehicle 10. In the drawings, the in-vehicle communication device 50 may be also referred to as "IN-VEHICLE COM DEVICE". The in-vehicle communication device 50 has at least a V2N (vehicle to cellular network) communication function in accordance with communication standards such as LTE (long term evolution) and 5G, and sends and receives radio waves to and from base stations and the like in the periphery of the vehicle 10. The in-vehicle communication device 50 may further have functions such as road-to-vehicle (vehicle to roadside infrastructure, hereinafter "V2I") communication and inter-vehicle (vehicle to vehicle, hereinafter "V2V") communication. The in-vehicle communication device 50 enables cooperation between a cloud system and an in-vehicle system (Cloud to Car) by the V2N communication. By mounting the in-vehicle communication device 50, the vehicle 10 becomes a connected car capable of connecting to the Internet. The in-vehicle communication device 50 corresponds to the acquisition unit of the present disclosure.

The in-vehicle communication device 50 acquires road traffic congestion information such as road traffic conditions and traffic regulations from FM multiplex broadcasting and beacons provided on roads by using VICS (vehicle information and communication system), for example. In the VICS, for example, a determination speed is determined in advance for each road (such as an ordinary road, a highway, and the like), and when the vehicle speed of a traveling vehicle (other vehicle 20) on each road falls below the determination speed, it is determined that the traffic congestion occurs. For this determination speed, for example, a value such as 10 km/h is used for ordinary roads and 40 km/h for highways. The in-vehicle communication device 50 grasps a congested section (start point to end point) of a travel destination as a state of occurrence of traffic congestion.

The in-vehicle communication device 50 provides traffic congestion information based on VICS and the like to the first autonomous driving ECU 60, the second autonomous driving ECU 70, the HCU 160, and the like.

The first autonomous driving ECU 60 and the second autonomous driving ECU 70 mainly include a computer including processor 62, 72, memories 61, 71, input/output interface, and buses connecting them, respectively. The first autonomous driving ECU 60 and the second autonomous driving ECU 70 are ECUs capable of executing autonomous driving control that partially or substantially completely controls the traveling of the vehicle 10.

The first autonomous driving ECU 60 has a partially autonomous driving function that partially substitutes for the driving operation of the driver. The second autonomous driving ECU 70 has an autonomous driving function capable of substituting for the driving operation of the driver. For example, the first autonomous driving ECU 60 enables partial autonomous driving control (advanced driving assistance) that entails a periphery monitoring duty and is the level 2 or lower in autonomous driving levels defined by US Society of Automotive Engineers.

The first autonomous driving ECU 60 establishes multiple functional units that implement the above-mentioned advanced driving support by causing the processor 62 to execute multiple instructions according to the driving support program stored in the memory 61.

The first autonomous driving ECU 60 recognizes a traveling environment in the periphery of the vehicle 10 based on the detection information acquired from the periphery monitoring sensor 40. As one example, the first autonomous driving ECU 60 generates information (lane information) indicating the relative position and shape of the left and right lane markings or roadsides of the vehicle lane in which the vehicle 10 is currently traveling (hereinafter referred to as a current lane) as the analyzed detection information. In addition, the first autonomous driving ECU 60 generates, as analyzed detection information, information (preceding vehicle information) indicating the presence or absence of a preceding vehicle (other vehicle 20) with respect to the vehicle 10 in the current lane and the position and the speed of the preceding vehicle when there is the preceding vehicle.

Based on the preceding vehicle information, the first autonomous driving ECU 60 executes ACC (adaptive cruise control) that implements constant speed traveling of the vehicle 10 at a target speed or traveling following the preceding vehicle. The first autonomous driving ECU 60 executes LTA (lane tracing assist) control for maintaining the traveling of the vehicle 10 in the vehicle lane based on the lane information. Specifically, the first autonomous driving ECU 60 generates a control command for acceleration/deceleration or steering angle, and sequentially provides them to the vehicle control ECU 80 described later. The ACC control is one example of longitudinal control, and the LTA control is one example of lateral control.

The first autonomous driving ECU 60 implements level 2 autonomous driving operation by executing both the ACC and the STA control. The first autonomous driving ECU 60 may be capable of implementing level 1 autonomous driving operation by executing either the ACC or the LTA control.

On the other hand, the second autonomous driving ECU 70 enables autonomous driving control that does not entail the periphery monitoring duty and is at the level 3 or higher in the above-described autonomous driving levels. That is, the second autonomous driving ECU 70 enables the autonomous driving operation in which the driver is permitted to interrupt the peripheral monitoring. In other words, the second autonomous driving ECU 70 makes it possible to perform autonomous driving in which a second task is permitted.

The second task is an action other than a driving operation permitted to the driver, and is a predetermined specific action.

The second autonomous driving ECU 70 establishes multiple functional units that implement the above-described autonomous driving support by causing the processor 72 to execute multiple instructions according to the autonomous driving program stored in the memory 71.

The second autonomous driving ECU 70 recognizes the traveling environment in the periphery of the vehicle 10 based on the subject vehicle position and map data obtained from the locator ECU 34, the detection information obtained from the periphery monitoring sensor 40, the communication information obtained from the in-vehicle communication device 50, and the like. For example, the second autonomous driving ECU 70 recognizes the position of the current lane of the vehicle 10, the shape of the current lane, the relative positions and relative velocities of moving bodies in the periphery of the vehicle 10, the traffic congestion, and the like.

In addition, the second autonomous driving ECU 70 identifies a manual driving area (MD area) and an autonomous driving area (AD area) in the traveling area of the vehicle 10, identifies a ST section and a non-ST section in the AD area, and sequentially outputs the recognition result to the HCU 160 described later.

The MD area is an area where the autonomous driving is prohibited. In other words, the MD area is an area where the driver performs all of the longitudinal control, lateral control, and peripheral monitoring of the vehicle 10. For example, the MD area is an area where the traveling road is a general road.

The AD area is an area where the autonomous driving is permitted. In other words, the AD area is an area in which the vehicle 10 can substitute at least one of the longitudinal control (forward-backward control), the lateral control (right-left control), or the peripheral monitoring. For example, the AD area is an area where the travelling road is a highway or a motorway.

The AD area is divided into the non-ST section where the autonomous driving at level 2 or lower is possible and the ST section where the autonomous driving at level 3 or higher is possible. In the present embodiment, it is assumed that the non-ST section where the level 1 autonomous driving operation is permitted and the non-ST section where the level 2 autonomous driving operation is permitted are equivalent.

The ST section is, for example, a traveling section (traffic congestion section) in which the traffic congestion occurs.

Further, the ST section is, for example, a traveling section in which a high-precision map is prepared. The HCU 160 described later determines that the vehicle 10 is in the ST section when the traveling speed of the vehicle 10 remains within a range equal to or less than the determination speed for a predetermined period. Alternatively, the HCU 160 may determine whether the area is the ST section by using the subject vehicle position and traffic congestion information obtained from the in-vehicle communication device 50 via the VICS and the like. Furthermore, in addition to the traveling speed of the vehicle 10 (traffic congestion traveling section condition), the HCU 160 may determine whether the area is the ST section under a condition such that the traveling road has two or more lanes, there is an other vehicle 20 in the periphery of the vehicle (subject vehicle) 10 (in the same lane and adjacent lanes), the traveling road has a median strip, or the map DB has high-precision map data.

In addition to the traffic congestion section, the HCU 160 may also detect, as the ST section, a section where a specific condition other than traffic congestion is established regarding the periphery environment of the vehicle 10 (that is, a section where the vehicle 10 can travel at a constant speed, follow up a preceding vehicle, or travel with LTA (lane keep traveling) without the traffic congestion on a highway).

With the autonomous driving system including the above first and second autonomous driving ECUs 60 and 70, at least level 2 and level 3 autonomous driving equivalent to the level 2 and level 3 can be executed in the vehicle 10.

The vehicle control ECU 80 is an electronic control device that performs acceleration and deceleration control and steering control of the vehicle 10. The vehicle control ECU 80 includes a steering ECU that performs steering control, a power unit control ECU and a brake ECU that perform acceleration and deceleration control, and the like. The vehicle control ECU 80 acquires detection signals output from respective sensors such as a steering angle sensor, the vehicle speed sensor, and the like mounted on the vehicle 10, and outputs a control signal to each of traveling control devices of an electronic control throttle, a brake actuator, an EPS (electronic power steering) motor, and the like. The vehicle control ECU 80 controls each driving control device so as to implement the autonomous driving according to the control instruction by acquiring the control instruction of the vehicle 10 from the first autonomous driving ECU 60 or the second autonomous driving ECU 70.

Further, the vehicle control ECU 80 is connected to the in-vehicle sensor 81 that detects driving operation information of a driving member by the driver. The in-vehicle sensor 81 includes, for example, a pedal sensor that detects the amount of depression of the accelerator pedal, a steering sensor that detects the amount of steering of the steering wheel, and the like. In addition, the in-vehicle sensor 81 includes a vehicle speed sensor that detects the traveling speed of the vehicle 10, a rotation sensor that detects the operating rotation speed of the traveling drive unit (an engine, a traveling motor, and the like), a shift sensor that detects the shift position of the transmission, and the like. The vehicle control ECU 80 sequentially provides the detected driving operation information, vehicle operation information, and the like to the HCU 160.

Next, the configuration of the display apparatus 100 will be described. The display apparatus 100 includes, as the display units, multiple display devices and, as a display controller, the HCU 160. In addition, the display apparatus 100 is provided with an audio device 140, an operation device 150, and the like.

The multiple display devices include a head-up display (hereinafter, HUD) 110, a meter display 120, a center information display (hereinafter, CID) 130, and the like. The multiple display devices may further include respective displays EMB (for rear view), EML (for left view), EMR (for right view) of the electronic mirror system. The HUD 110, the meter display 120, and the CID 130 are display devices that present image contents such as still images or moving images to the driver as visual information. For example, images of the traveling road (traveling lane), the vehicle (subject vehicle) 10, the other vehicle 20, and the like are used as the image contents.

The HUD 110 projects the light of the image formed in front of the driver onto a projection area defined by a front windshield of the vehicle 10 or the like based on the control signal and video data acquired from the HCU 160. The light of the image that has been reflected toward the vehicle interior by the front windshield is perceived by the driver seated in the driver's seat. In this way, the HUD 110 displays a virtual image in the space in front of the projection area. The driver visually recognizes the virtual image in the angle of view displayed by the HUD 110 so as to overlap the foreground of the vehicle 10.

The meter display 120 and the CID 130 mainly include, for example, a liquid crystal display or an OLED (organic light emitting diode) display. The meter display 120 and the CID 130 display various images on the display screen based on the control signal and the video data acquired from the HCU 160. The meter display 120 is, for example, a main display unit installed in front of the driver's seat. The CID 130 is a sub-display unit provided in a central area in a vehicle width direction in front of the driver. For example, the CID 130 is installed above a center cluster in an instrument panel. The CID 130 has a touch panel function, and detects, for example, a touch operation and a swipe operation on a display screen by the driver or the like.

In the present embodiment, a case where the meter display 120 (main display unit) is used as the display unit will be described as an example.

The audio device 140 has multiple speakers installed in the vehicle interior. The audio device 140 presents a notification sound, a voice message, or the like as auditory information to the driver based on the control signal and voice data acquired from the HCU 160. That is, the audio device 140 is an information presentation device capable of presenting information in a mode different from visual information.

The operation device 150 is an input unit that receives a user operation by the driver or the like. For example, user operations related to the start and stop of each level of the autonomous driving function are input to the operation device 150. The operation device 150 includes, for example, a steering switch provided on a spoke unit of the steering wheel, an operation lever provided on a steering column unit, a voice input device for recognizing contents of a driver's speech, and an icon for touch operation on the CID 130 (switch), and the like.

The HCU 160 performs display control on the meter display 120 based on the information acquired by the locator 30, the periphery monitoring sensor 40, the in-vehicle communication device 50, the first autonomous driving ECU 60, the second autonomous driving ECU 70, the vehicle control ECU 80, and the like, as described above. The HCU 160 mainly includes a computer including a processor 162, a memory 161, an input/output interface, a bus connecting these components, and the like.

The memory 161 is, for example, at least one type of non-transitory tangible storage medium, such as a semiconductor memory, a magnetic storage medium, and an optical storage medium, for non-transitory storing or memorizing computer readable programs and data. The memory 161 stores various programs executed by the processor 162, such as a presentation control program described later.

The processor 162 is a hardware for arithmetic processing. The processor 162 includes, as a core, at least one type of, for example, a CPU (central processing unit), a GPU (graphics processing unit), an RISC (reduced instruction set computer) CPU, and the like.

The processor 162 executes multiple instructions included in the presentation control program stored in the memory 161. Thereby, the HCU 160 provides multiple functional units for controlling the presentation to the driver. As described above, in the HCU 160, the presentation control program stored in the memory 161 causes the processor 162 to execute multiple instructions, thereby constructing multiple functional units.

The HCU 160 acquires the traveling environment recognition result from the first autonomous driving ECU 60 or the second autonomous driving ECU 70. The HCU 160 grasps a periphery state of the vehicle 10 based on the acquired recognition result. Specifically, the HCU 160 grasps the approach to the AD area, the entry into the AD area, the approach to the ST section (traffic congestion section), the entry into the ST section, and the like. The HCU 160 may grasp the periphery state based on information directly obtained from the locator ECU 34, the periphery monitoring sensor 40, or the like instead of the recognition results obtained from the first and second autonomous driving ECUs 60 and 70.

The HCU 160 determines that the autonomous driving operation is not permitted when the vehicle 10 is traveling in the MD area. On the other hand, the HCU 160 determines that the autonomous driving operation at the level 2 or higher is permitted when the vehicle 10 is traveling in the AD area. Further, the HCU 160 determines that level 2 autonomous driving can be permitted when the vehicle is traveling in the non-ST section of the AD area, and determines that the level 3 autonomous driving can be permitted when the vehicle is traveling in the ST section.

The HCU 160 determines the level of autonomous driving to be actually executed based on the periphery state of the vehicle 10, a driver state, the level of currently permitted autonomous driving, input information to the operation device 150, and the like. That is, the HCU 160 determines execution of the level of autonomous driving when an instruction to start the currently permitted level of autonomous driving is acquired as input information.

The HCU 160 controls presentation of content related to the autonomous driving. Specifically, the HCU 160 selects a content to be presented on each display device 110, 120, 130 based on various information.

The HCU 160 generates a control signal and video data to be provided to each display device 110, 120, 130 and a control signal and audio data to be provided to the audio device 140. The HCU 160 outputs the generated control signal and each data to each presentation device, thereby presenting information on each of the display devices 110, 120, and 130.

The display apparatus 100 is configured as described above. Hereinafter, the operation and the effects will be described with further reference to FIGS. 2 to 4.

The present embodiment exemplifies a case where, at the autonomous driving level 2 during the highway traveling, the autonomous driving level 3 (traffic congestion following driving) is performed in the traffic congestion occurrence section. Conditions for enabling the autonomous driving level 3 (predetermined autonomous driving possible conditions) are, for example, that the vehicle speed is 10 km/h or less, and that other vehicles 20 (or shoulders) block the front, left and right of the subject vehicle 10 in multiple traveling lanes exist.

Then, for example, when the occurrence (vehicle speed 40 km/h or less) of the traffic congestion ahead of the vehicle is detected based on VICS information of the in-vehicle communication device 50 ("traffic congestion detection" in FIG. 2), the HCU 160 displays transition information related to transition to the autonomous driving on the meter display 120 ("transition information" in FIG. 2) by using images such as the traveling road, the subject vehicle 10, and the other vehicle 20 until the autonomous driving possible condition is satisfied.

Figure 2:
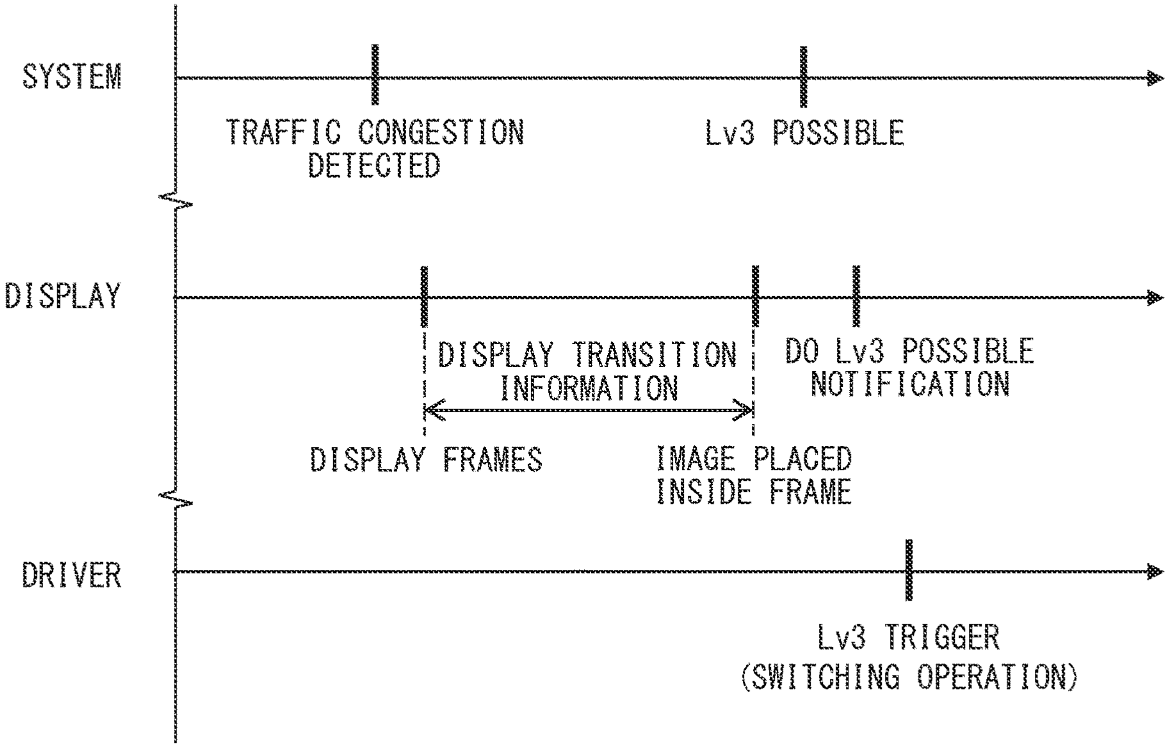
FIG. 2 is a time chart showing a timing of displaying transition information when a traffic congestion is detected.
Figure 3:
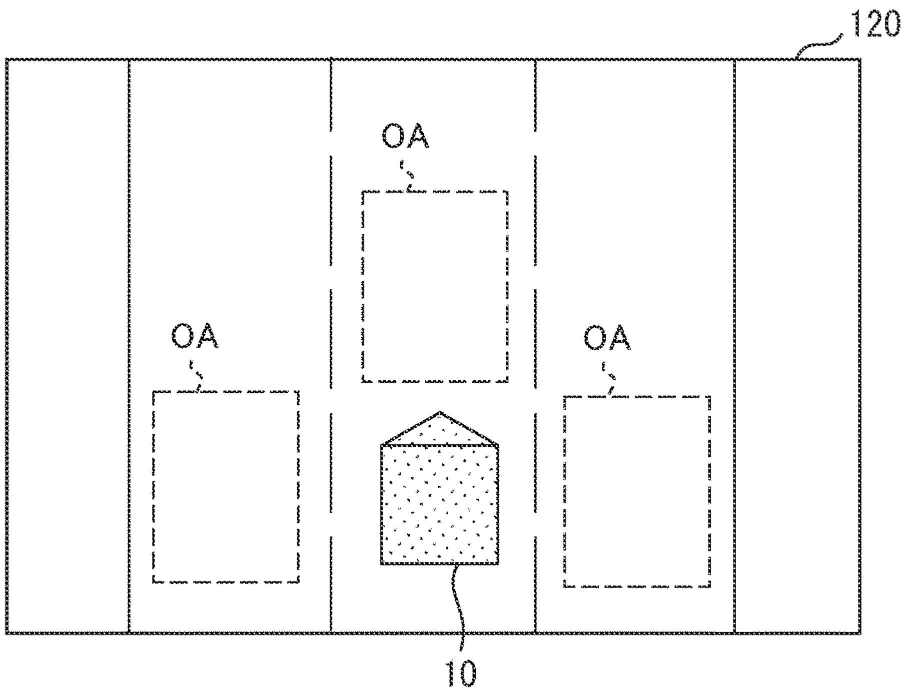
FIG. 3 is an explanatory view showing multiple other vehicle areas when displayed on a planer form in a first embodiment.

As shown in FIG. 3, the transition information is displayed in a planer form, and includes an image of the vehicle 10 in multiple traveling lanes (three lanes in this case) and images of other vehicle areas OA formed in front of the subject vehicle 10 and on the left and right sides. The other vehicle area OA indicates a position of the other vehicle 20 with respect to the subject vehicle 10, and enables the autonomous driving level 3 during the traffic congestion. Here, in multiple lanes, positions corresponding to the front and left and right of the subject vehicle 10 are the other vehicle areas OA. The other vehicle area OA is, for example, a rectangular frame image with broken lines ("display frames" in FIG. 2).

Figure 4:
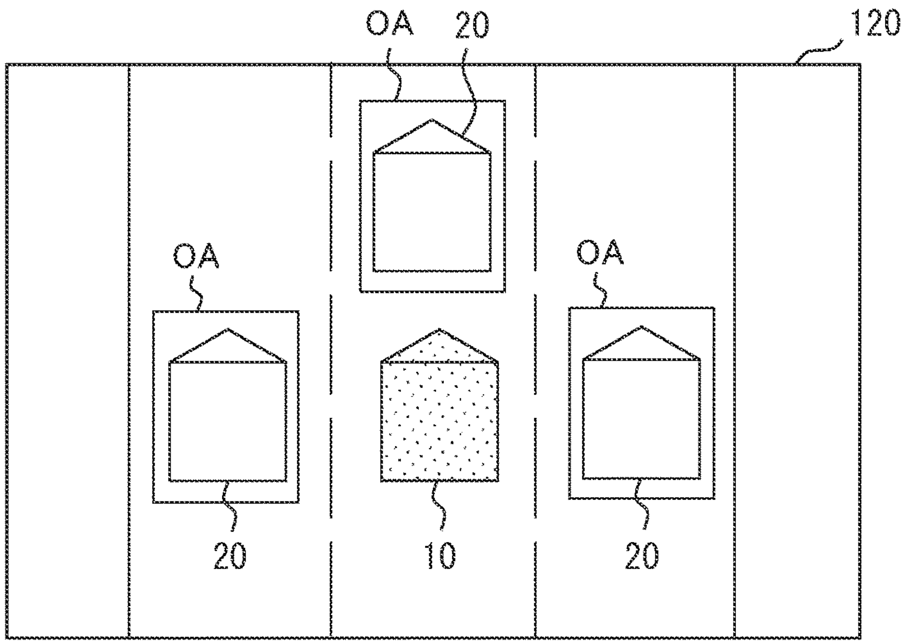
FIG. 4 is an explanatory view showing a state in which other vehicles enter multiple other vehicle areas respectively in FIG. 3.

Then, the HCU 160 grasps the position of the subject vehicle 10 by the locator 30 and the position of the other vehicle 20 by the periphery monitoring sensor 40 and the in-vehicle communication device 50. As shown in FIG. 4, in a case where, with the occurrence of traffic congestion, the other vehicle 20 are actually positioned in all of the other vehicle areas OA in front of the subject vehicle 10 and on the left and right sides, a predetermined period of time (for example, 5 seconds) elapses, and the HCU 160 confirms the determination that there is the traffic congestion. Then, the HCU 160 displays an image of the other vehicle 20 in the other vehicle area OA (broken-line square frame) as transition information, and further changes the broken-line square frame to a solid-line square frame ("image placed inside frame" in FIG. 2).

When the transition information is displayed as described above (FIG. 4), it indicates that the transition to autonomous traveling is possible ("Lv3 possible" in FIG. 2). Further, along with the autonomous driving possible determination, the HCU 160 causes the meter display 120 to display a request for a switching operation to the autonomous driving for the driver ("Lv3 possible notification" in FIG. 2). The switching to autonomous driving level 3 is performed by the driver operation on the operation device 150 ("Lv3 trigger" in FIG. 2).

As described above, in the present embodiment, when the traffic congestion occurrence is detected based on the position information of the subject vehicle 10 and the traffic congestion information of the other vehicle 20, the HCU 160 displays the transition information related to the transition to the autonomous driving on the meter display 120 by using at least one of images of the traveling road, the subject vehicle 10, or the other vehicle 20, until the autonomous driving possible condition is satisfied.

Thereby, since the driver can clearly recognize the current traffic congestion based on the transition information on the meter display 120, the driver can correctly grasp whether the transition to the autonomous driving is possible. That is, the driver can grasp whether the current situation is a situation where the subject vehicle 10 travels for transition to the autonomous driving level 3 in the traffic congestion or a situation where the transition to the autonomous driving level 3 is not possible and the subject vehicle 10 merely travels at the low speed in the traffic congestion.

First Modification of First Embodiment

Figure 5:
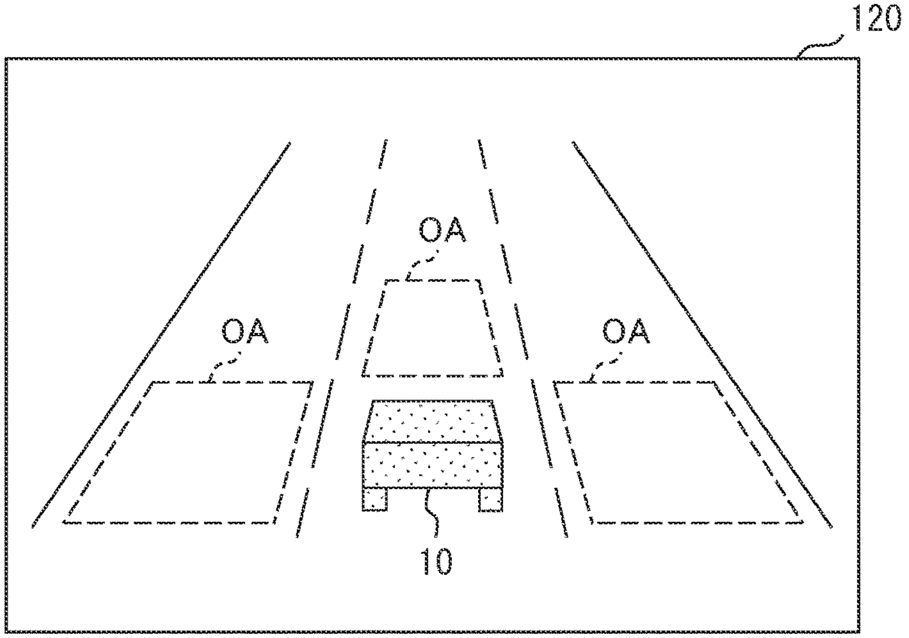
FIG. 5 is an explanatory view showing the multiple other vehicle areas when displayed on a bird's-eye view form in a first modification of the first embodiment.
Figure 6:
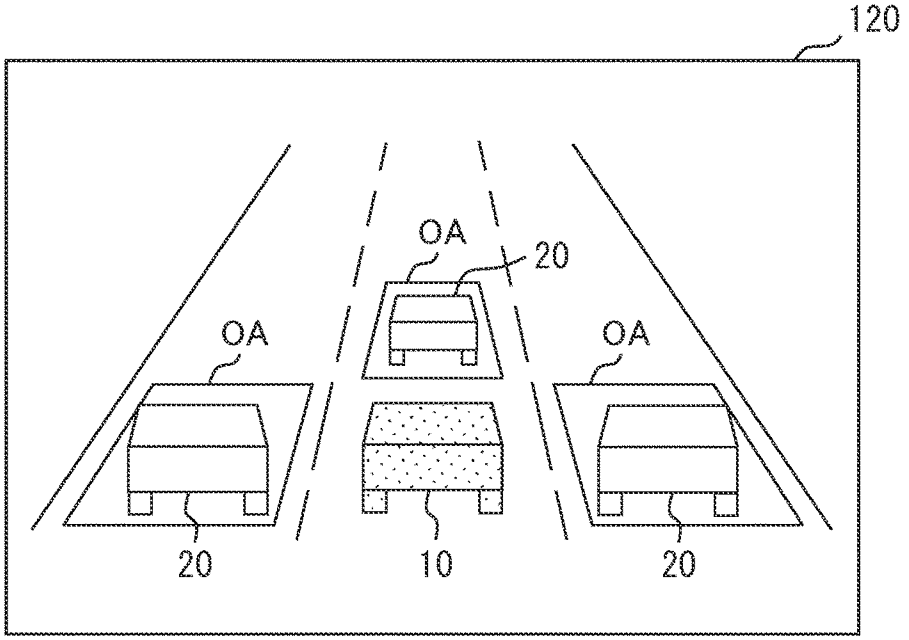
FIG. 6 is an explanatory view showing a state in which the other vehicles enter the multiple other vehicle areas respectively in FIG. 5.

FIGS. 5 and 6 show a first modification of the first embodiment. In the first modification of the first embodiment, the display form of the traveling road, the subject vehicle 10, the other vehicle 20, and the other vehicle area OA are changed from a planer display form to a bird's-eye view display form. The bird's-eye view may be also referred to as an overhead view. Thereby, the display becomes realistic, and the driver can easily grasp the state of the traffic congestion.

Second Modification of First Embodiment

Figure 7:
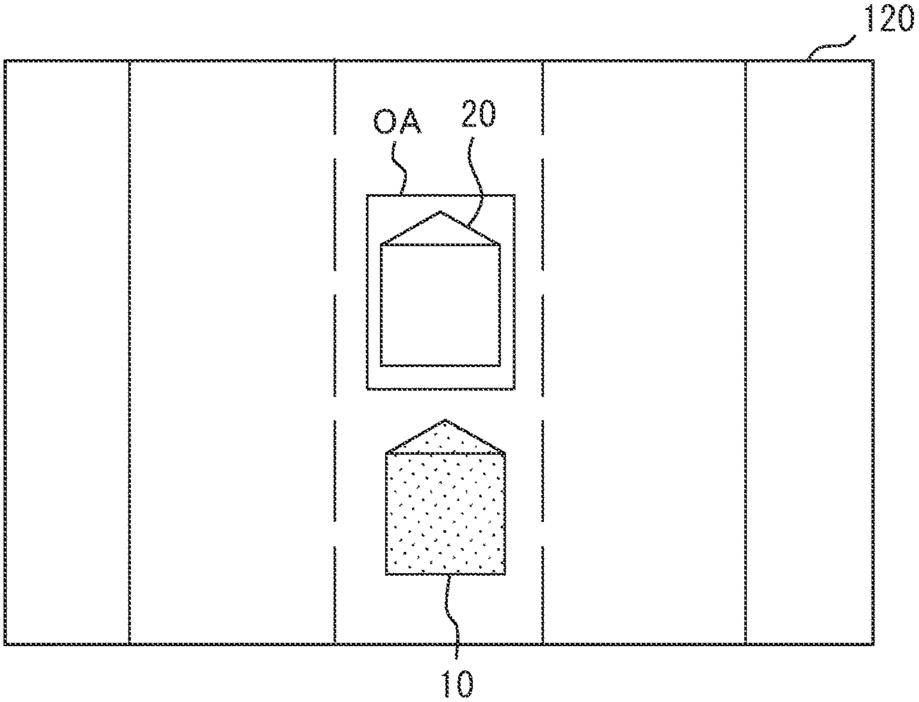
FIG. 7 is an explanatory view showing a state in which the other vehicle enters one other vehicle area when displayed on the planer form in a second modification of the first embodiment.
Figure 8:
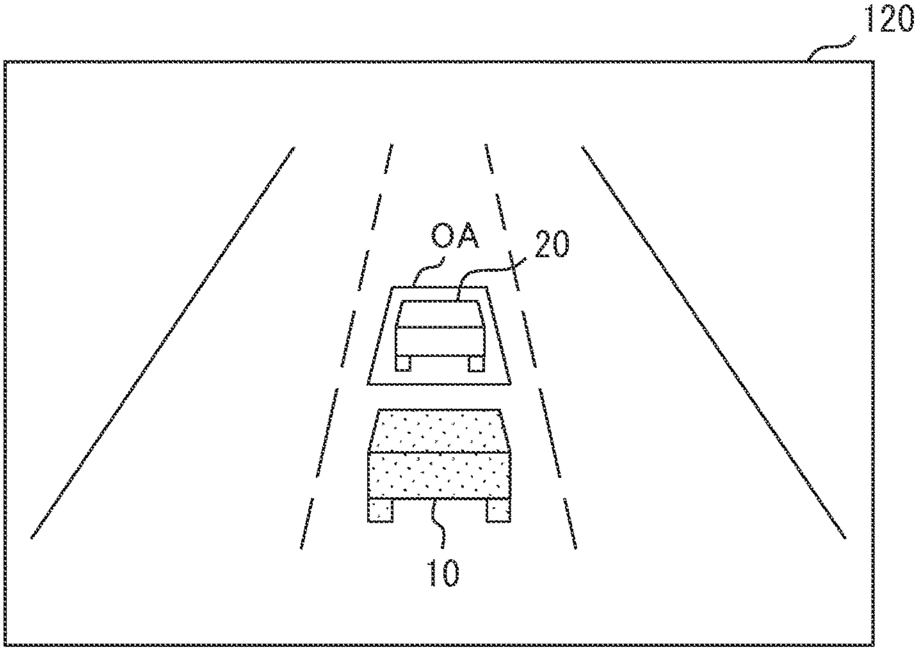
FIG. 8 is an explanatory view showing a state in which the other vehicle enters one other vehicle area when displayed in the bird's-eye view form with respect to FIG. 7.

FIGS. 7 and 8 show a second modification of the first embodiment. In the second modification of the first embodiment, the autonomous driving possible condition is changed. Accordingly, the display form of the other vehicle area OA is changed. FIG. 7 shows an example of planar display, and FIG. 8 shows an example of bird's-eye view display.

Here, the second modification is different from the above-described first embodiment. In the second modification, the autonomous driving possible condition is that the actual vehicle speed is 10 km/s or less and the other vehicle 20 exists only in front of the subject vehicle 10. Accordingly, on the meter display 120, the other vehicle area OA as the transition information is displayed only in front of the subject vehicle 10 (broken line display). When the other vehicle 20 is positioned in this front other vehicle area OA, the image of the other vehicle 20 is displayed inside the other vehicle area OA and the frame line is changed to a solid line. When this state is satisfied, the transition to the autonomous driving is determined to be possible, and the switching to the autonomous driving is performed.

Also in the present embodiment, it may be possible to obtain the similar effect to the above-described first embodiment by displaying the transition information.

Second Embodiment

Figure 9:
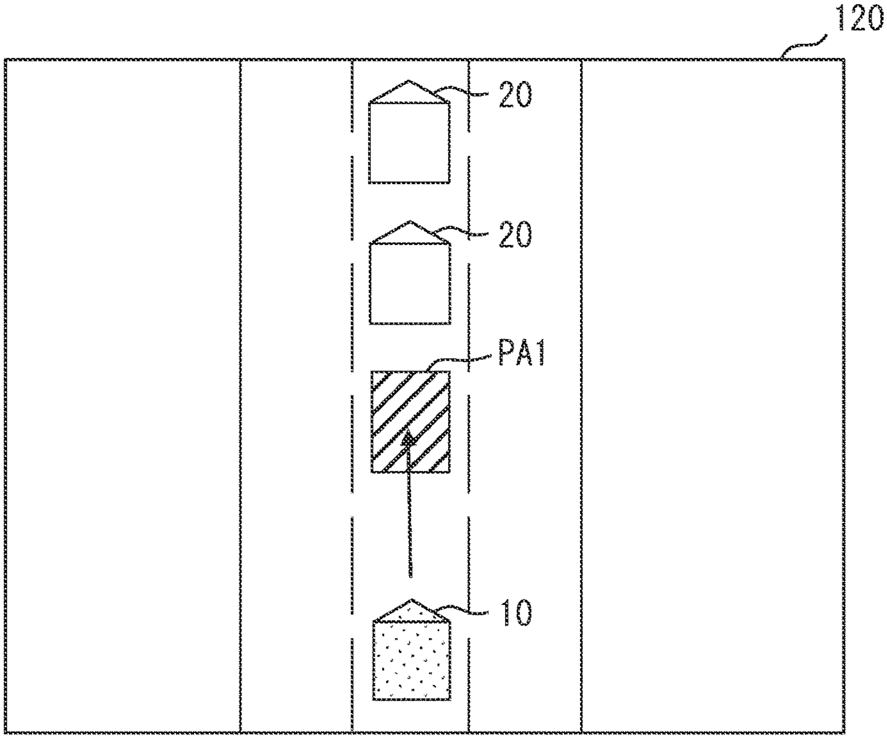
FIG. 9 is an explanatory view showing a possible area in one traveling lane in a second embodiment.
Figure 10:
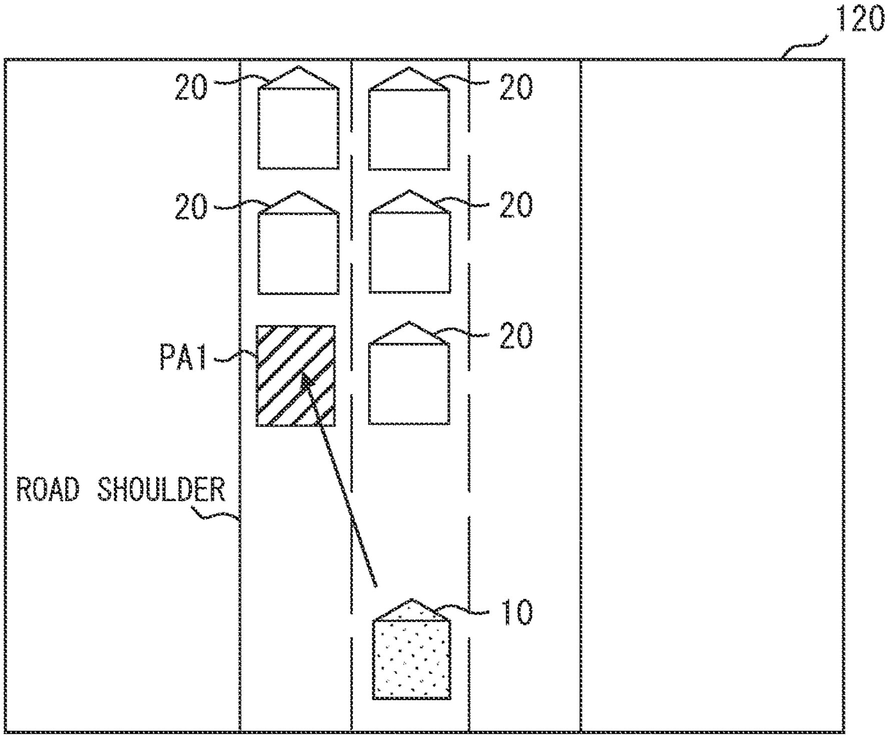
FIG. 10 is an explanatory view showing the possible areas in multiple lanes in the second embodiment.

FIGS. 9 and 10 a second embodiment. In the second embodiment, the HCU 160 displays, as the transition information, a possible area PA1 where the autonomous driving is possible.

Here, the conditions under which autonomous driving level 3 is possible include a vehicle speed condition (10 km/h or less) and a position of the subject vehicle 10 that should follow the other vehicle 20. Accordingly, the possible area PA1 is information indicating a vehicle among the other vehicles 20 forming the traffic congestion. When the subject vehicle 10 follows the indicated vehicle, the autonomous driving level 3 becomes possible.

FIG. 9 shows an example in which a position immediately behind the other vehicle 20 in front of the subject vehicle 10 is formed as the possible area PA1 in the traveling lane in which the vehicle 10 is traveling. Further, FIG. 10 shows an example in which the possible area PA1 is formed in a position where the front side and the left and right sides of the subject vehicle 10 are surrounded by other vehicles 20 (including a road shoulder) in multiple traveling lanes. The possible area PA1 is formed as, for example, a rectangular area display image.

The HCU 160 grasps the position of the subject vehicle 10 by the locator 30 and the position of the other vehicle 20 by the periphery monitoring sensor 40 and the in-vehicle communication device 50. Then, the HCU 160 displays, on meter display 120, the subject vehicle 10, the other vehicle 20, and the possible area PA1 in the multiple traveling lanes. Then, as shown by arrows in FIGS. 9 and 10, when the subject vehicle 10 enters the possible area PA1 at the vehicle speed of 10 km/h or less, the transition to the autonomous driving is possible, and the switching to the autonomous driving level 3 is performed.

Thereby, the driver can easily grasp whether it is possible to transit to the autonomous driving depending on the position of the subject vehicle 10 with respect to the possible area PA1.

First Modification of Second Embodiment

Figure 11:
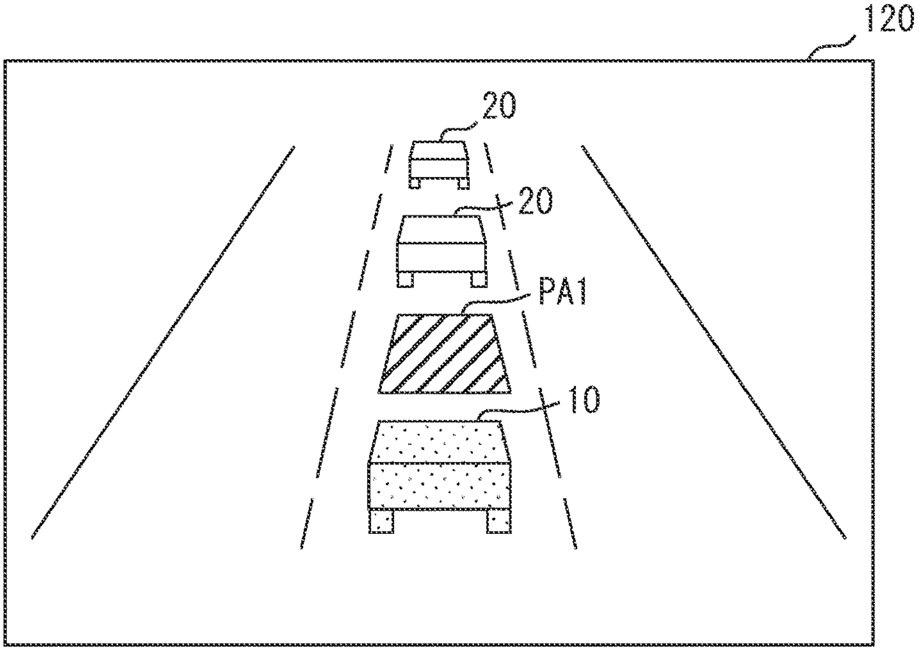
FIG. 11 is an explanatory view showing the possible area (vehicle position) in one traveling lane when displayed in the bird's-eye view form in a first modification of the second embodiment.
Figure 12:
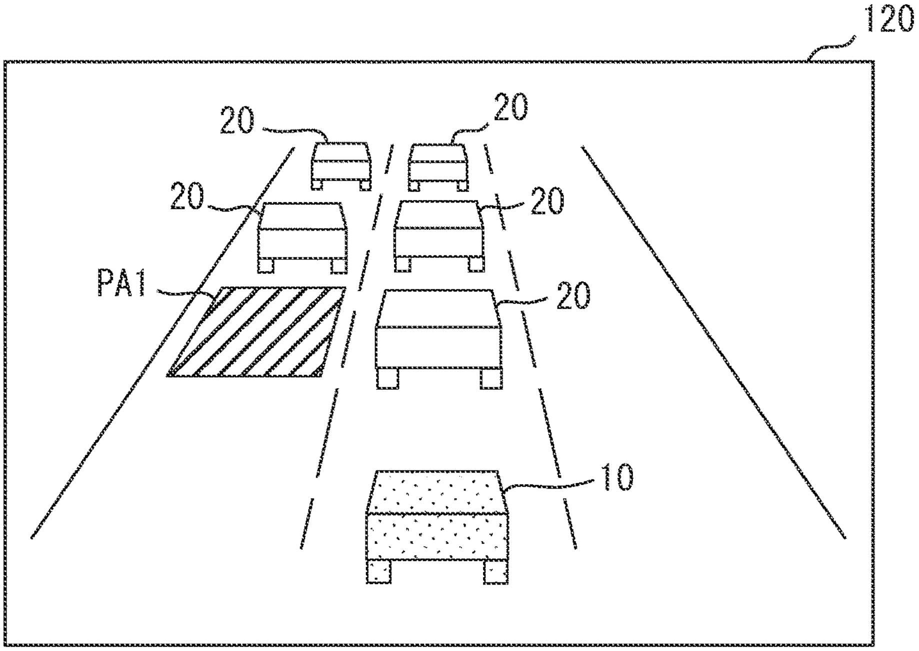
FIG. 12 is an explanatory view showing the possible area (vehicle position) in multiple traveling lanes when displayed in the bird's-eye view form in the first modification of the second embodiment.

FIGS. 11 and 12 show a first modification of the second embodiment. In the first modification of the second embodiment, the traveling road, the subject vehicle 10, the other vehicle 20, and the possible area PA1 are changed from the planer display form to the bird's-eye view display form. Thereby, the display becomes realistic, and the driver can easily grasp the state of the traffic congestion and the possibility of transition to the autonomous driving.

Figure 13:
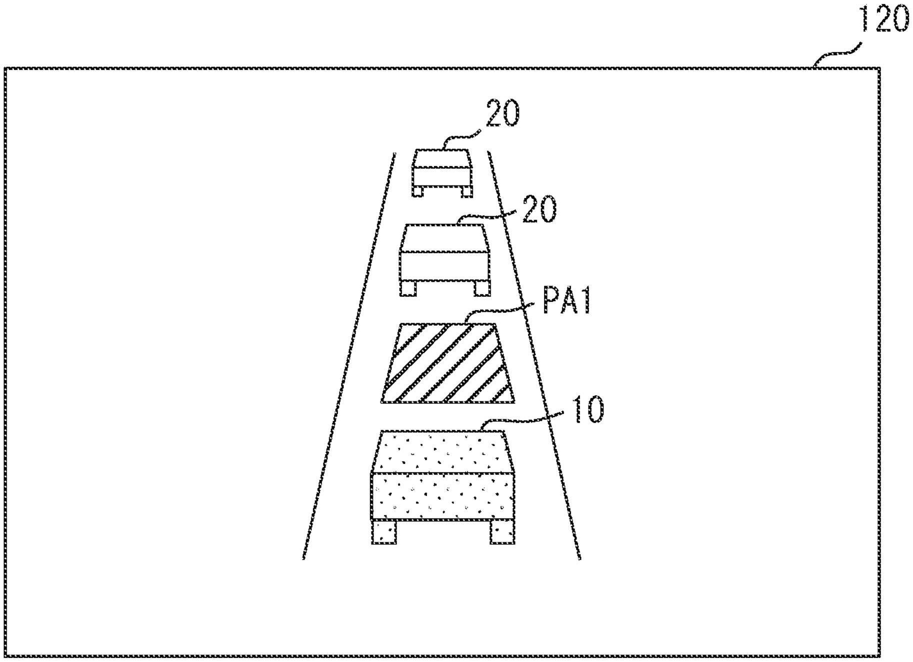
FIG. 13 is an example view showing a case of one vehicle lane on one side in the first modification of the second embodiment.

Although FIGS. 11 and 12 show the road having multiple traveling lanes, FIG. 13 shows a road having a single lane on one side.

Third Embodiment

Figure 14:
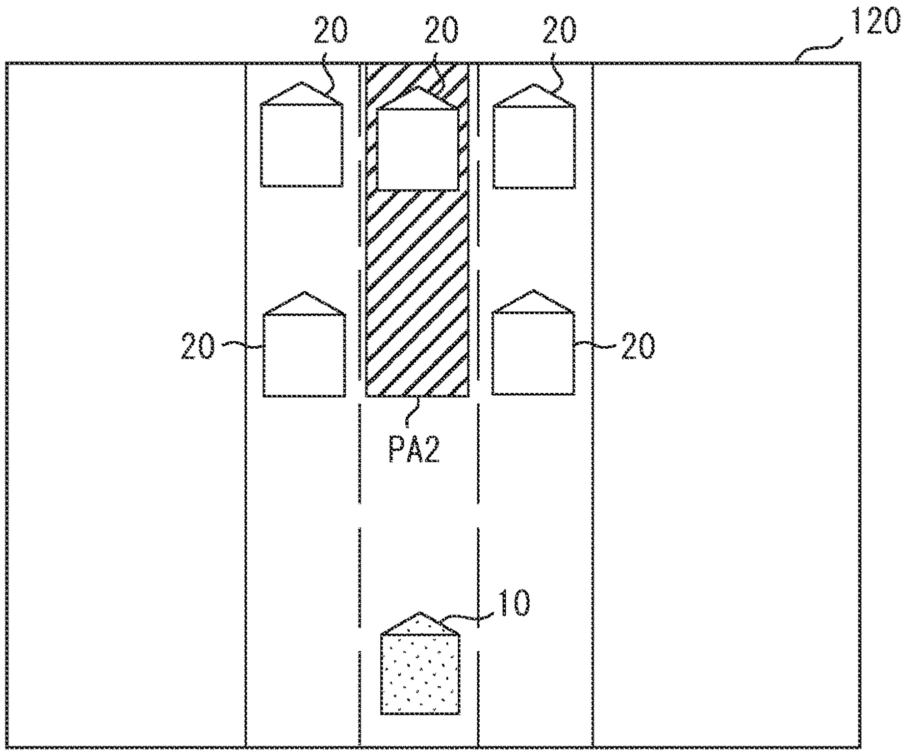
FIG. 14 is an explanatory view showing the possible area (traveling vehicle lane) in multiple traveling lanes when displayed in the planer form in a third embodiment.

FIG. 14 show a third embodiment. The third embodiment is different from the second embodiment described above (FIGS. 9 and 10). In the third embodiment, a possible area PA2 is shown by a traveling lane where the subject vehicle 10 should follow the other vehicle 20.

For example, when the subject vehicle 10 approaches the other vehicle 20, there are positions where the subject vehicle 10 is sandwiched by the other vehicles 20 in front of the subject vehicle 10 and on the left and right sides. Accordingly, the HCU 160 displays the traveling lane including this position as the possible area PA2.

The HCU 160 grasps the position of the subject vehicle 10 by the locator 30 and the position of the other vehicle 20 by the periphery monitoring sensor 40 and the in-vehicle communication device 50. Then, the HCU 160 displays, on meter display 120, the subject vehicle 10, the other vehicle 20, and the possible area PA2 in the multiple traveling lanes. Then, when the subject vehicle 10 enters the possible area PA2 at the vehicle speed of 10 km/h or less, the transition to the autonomous driving is possible, and the switching to the autonomous driving level 3 is performed.

Thereby, the driver can easily grasp whether it is possible to transit to the autonomous driving depending on the position of the subject vehicle 10 with respect to the possible area PA2.

First Modification of Third Embodiment

Figure 15:
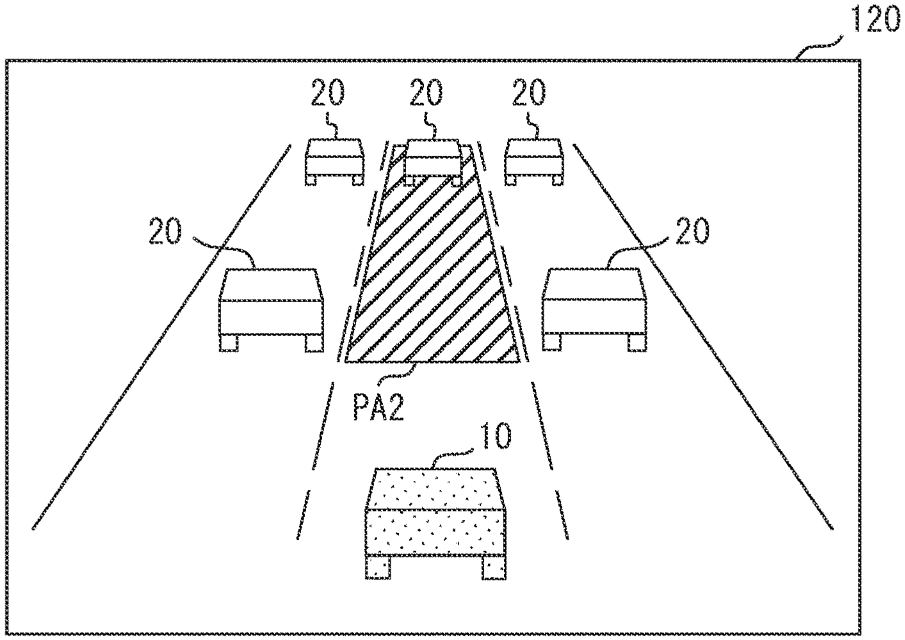
FIG. 15 is an explanatory view showing the possible area (traveling vehicle lane) in multiple traveling lanes when displayed in the bird's-eye view form in a first modification of the third embodiment.

FIG. 15 shows a first modification of the third embodiment. In the first modification of the third embodiment, the traveling road, the subject vehicle 10, the other vehicle 20, and the possible area PA2 are changed from the planer display form to the bird's-eye view display form. Thereby, the display becomes realistic, and the driver can easily grasp the state of the traffic congestion and the possibility of transition to the autonomous driving.

Fourth Embodiment

Figure 16:
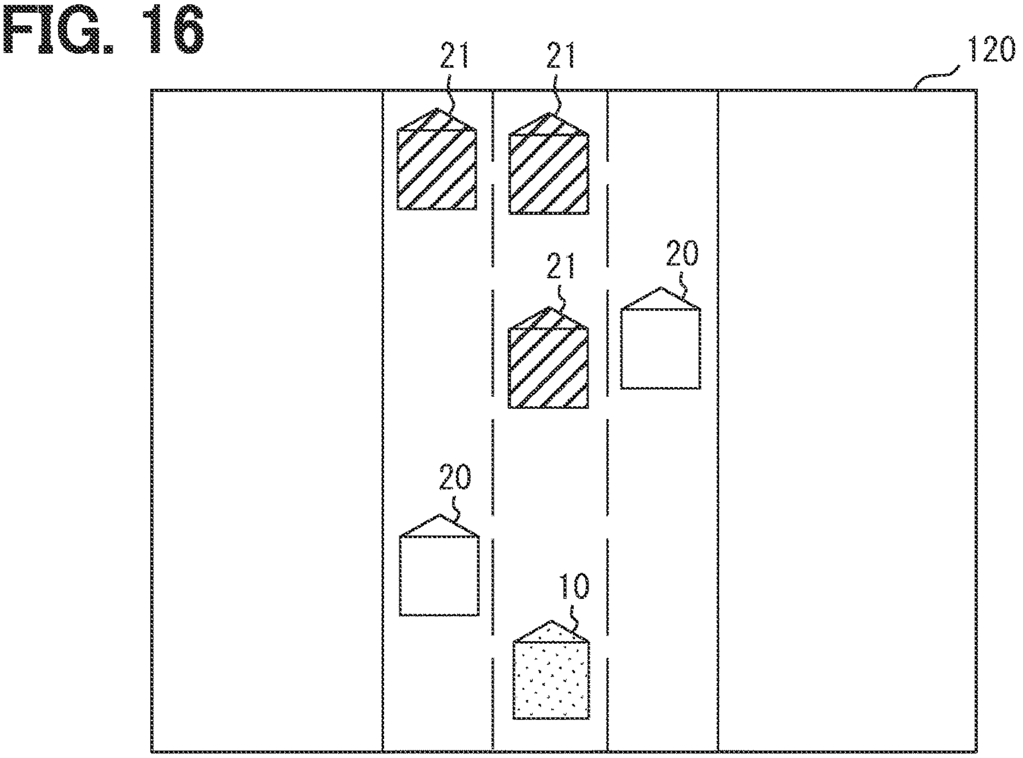
FIG. 16 is an explanatory view showing other vehicles forming the traffic congestion when displayed in the planer form in a fourth embodiment.

A fourth embodiment is shown in FIG. 16. In the fourth embodiment, the HCU 160 displays other vehicles 21 forming the traffic congestion as transition information in a form different from the normal display. FIG. 16 shows a case of planar display.

For example, when the other vehicles 20 are normally displayed in blue, the HCU 160 displays the other vehicles 21 in the traffic congestion in red (indicated by hatching in FIG. 16). In FIG. 16, the other vehicles 21 are connected to each other toward the destination, and are displayed in red to indicate that they are in the traffic congestion. Further, there is no other vehicle 20 in front of the other vehicle 20 in the right lane in FIG. 16. Furthermore, the other vehicle 20 in the left lane has a certain distance to the other vehicle 21 in front. These situations are not the traffic congestion situations, and the other vehicles 20 are displayed in blue.

In this way, the other vehicles 21 forming the traffic congestion are identified by, for example, colors with respect to the other vehicles 20 not forming the traffic congestion, so that the driver can clearly grasp the traffic congestion situation. For example, when the vehicle is in the rear of the vehicle 21, it is possible to easily grasp that the transition to autonomous driving is possible.

First Modification of Fourth Embodiment

Figure 17:
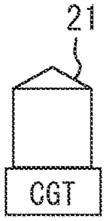
FIG. 17 is an explanatory view showing the other vehicle forming the traffic congestion in a first modification of the fourth embodiment.
Figure 18:
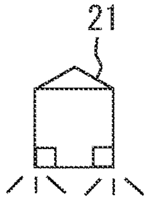
FIG. 18 is an explanatory view showing the other vehicle forming the traffic congestion in the first modification of the fourth embodiment.

FIGS. 17 and 18 show a first modification of the fourth embodiment. The first modification of the fourth embodiment is different from the above-described fourth embodiment in that the other vehicle 21 forming the traffic congestion is provided with an identification display.

The identification display in FIG. 17 is, for example, an identification display using characters such as "congestion" added to the rear of the image of the other vehicle 21. In the drawings, the congestion may be also referred to as "CGT". Further, the identification display in FIG. 18 is, for example, identification display using images expressing blinking at the rear of the image of the other vehicle 21. In addition, as the identification display (expression of identification), various expressions are possible, such as changing the design of the image of the other vehicle 21, changing the drawing line type, and the like. Thereby, effects similar to the effects of the fourth embodiment can be achieved.

Second Modification of Fourth Embodiment

Figure 19:
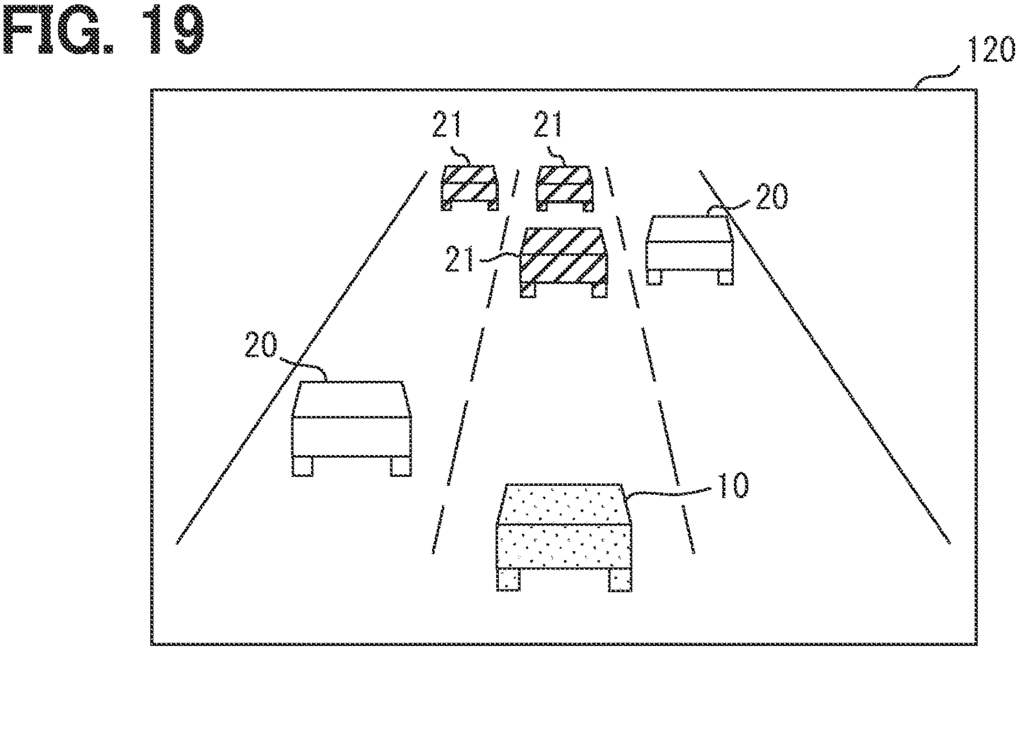
FIG. 19 is an explanatory view showing other vehicles forming the traffic congestion when displayed in the bird's-eye view form in a second modification of the fourth embodiment.

FIG. 19 shows a second modification of the fourth embodiment. In the second modification of the fourth embodiment, the display form of the meter display 120 may be the bird's-eye view display instead of the planar display (FIG. 16). Thereby, the display becomes realistic, and the driver can easily grasp the state of the traffic congestion and the possibility of transition to the autonomous driving.

Third Modification of Fourth Embodiment

Figure 20:
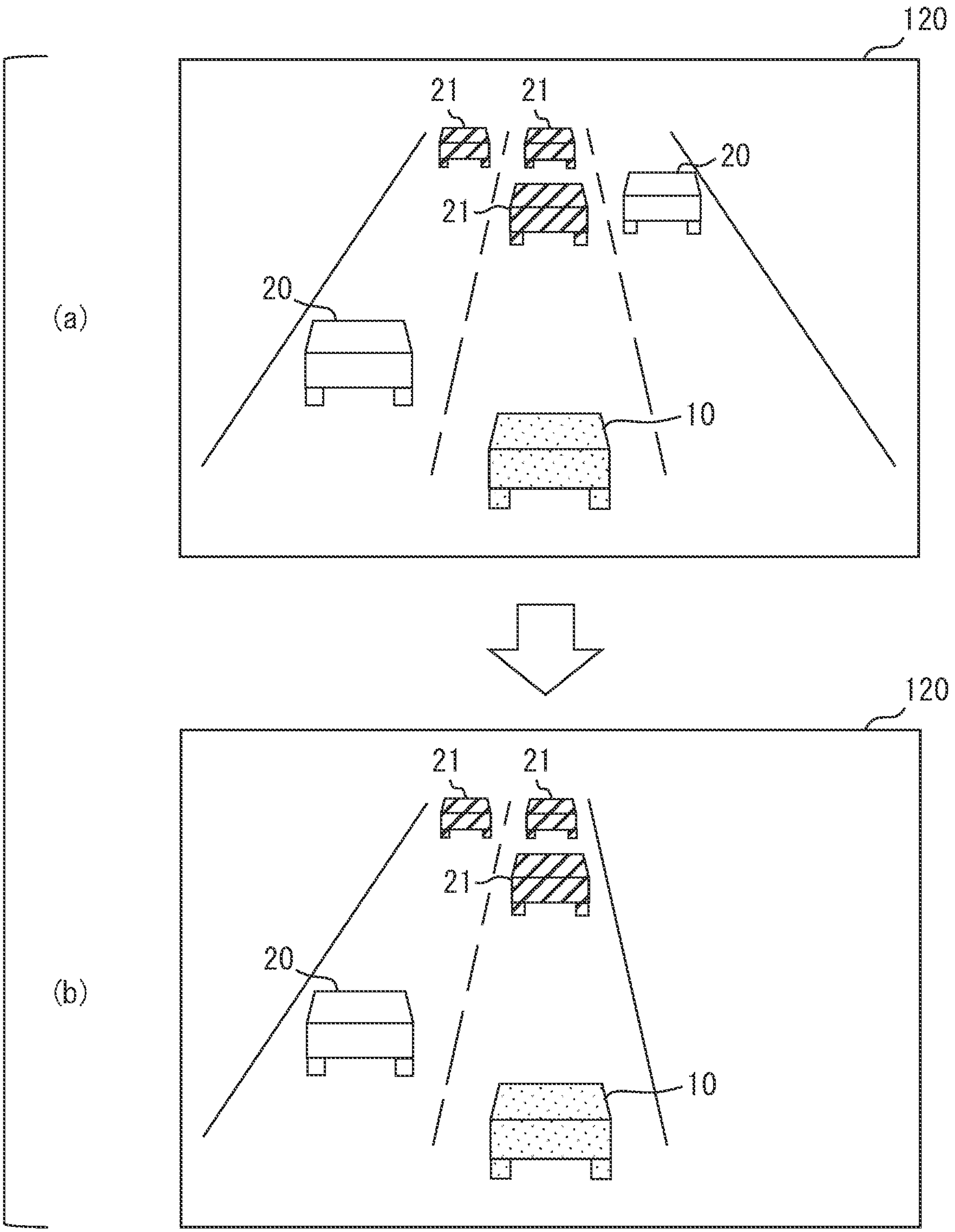
FIG. 20 is an explanatory view showing other vehicles forming the traffic congestion when displayed in the bird's-eye view form in a third modification of the fourth embodiment.

FIG. 20 shows a third modification of the fourth embodiment. In the third modification, the HCU 160 displays, as transition information, only the traveling lanes in which the traffic congestion following driving is possible among the multiple traveling lanes. For example, as shown in a part (a) of FIG. 20, when there is no traffic congestion in the right lane of three lanes, the HCU 160 displays, on the meter display 120, as shown in a part (b) of FIG. 20, only the subject vehicle lane and the left lane, as if a two-lane road were displayed. Thereby, the driver can clearly grasp the traffic congestion situation. For example, the driver can easily grasp the situation that the transition to the autonomous driving is possible if the vehicle travels in the subject vehicle lane or the left lane.

Fifth Embodiment

Figure 21:
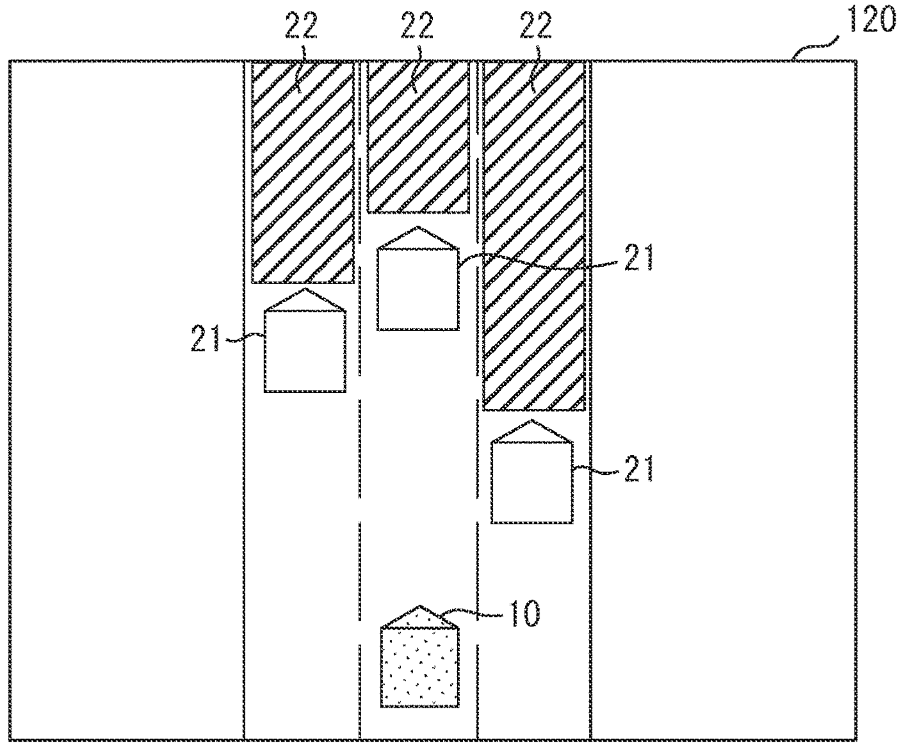
FIG. 21 is an explanatory view collectively showing the other vehicles forming the traffic congestion when displayed in the planer form in a fifth embodiment.

FIG. 21 shows a fifth embodiment. In the fifth embodiment, the HCU 160 displays, as the transition information, the other vehicles 21 that are not on the tail among the other vehicles 21 forming the traffic congestion. The other vehicles 21 that are not on the tail are displayed as a belt-shaped traffic congestion region 22 (one cluster). FIG. 21 shows a case of planar display. Thereby, effects similar to the effects of the fourth embodiment (FIG. 16) can be achieved.

First Modification of Fifth Embodiment

Figure 22:
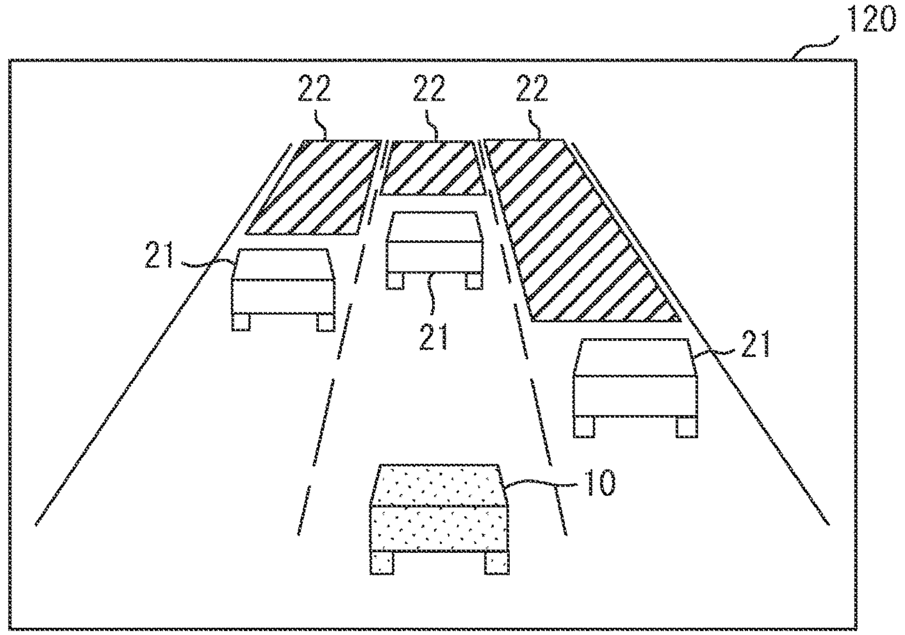
FIG. 22 is an explanatory view collectively showing the other vehicles forming the traffic congestion when displayed in the bird's-eye view form in a first modification of the fifth embodiment.

FIG. 22 shows a first modification of the fifth embodiment. In the first modification of the fifth embodiment, the display form of the meter display 120 may be the bird's-eye view display instead of the planar display (FIG. 21). Thereby, the display becomes realistic, and the driver can easily grasp the state of the traffic congestion and the possibility of transition to the autonomous driving.

Sixth Embodiment

Figure 23:
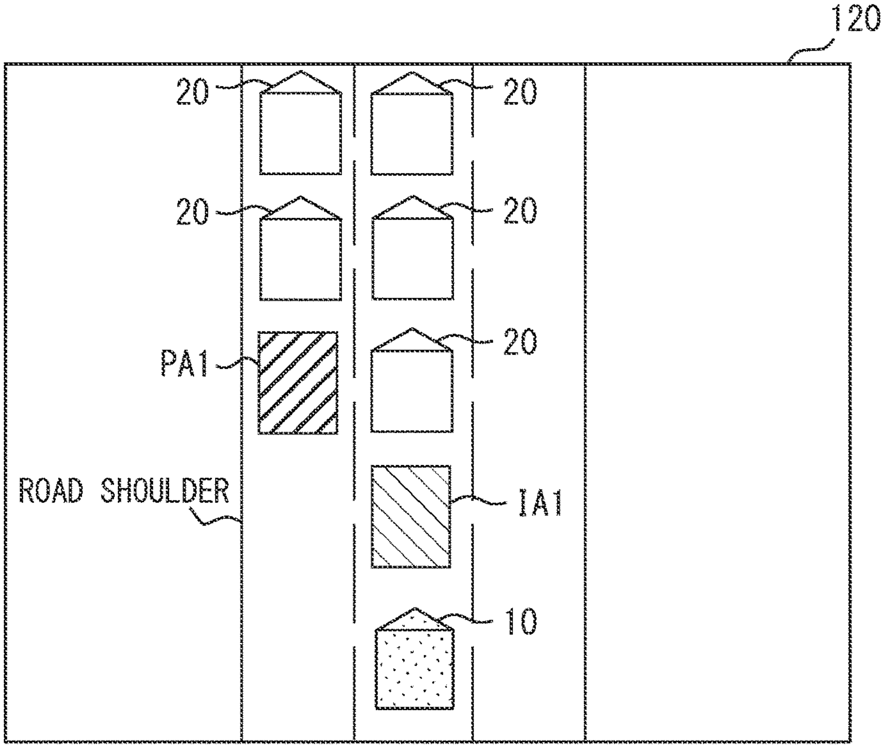
FIG. 23 is an explanatory view showing an impossible area according to a sixth embodiment.

FIG. 23 shows a sixth embodiment. In the sixth embodiment, the HCU 160 displays, as the transition information, an impossible area IA1 where the autonomous driving is impossible. The impossible area IA1 is, for example, an area where there are no other vehicles 20 in the left and right traveling lanes and the conditions for transition to the autonomous driving (traffic congestion following driving) are not satisfied. In this way, by displaying the impossible area IA1, it is possible to grasp that the transition to the autonomous driving is impossible.

Seventh Embodiment

Figure 24:
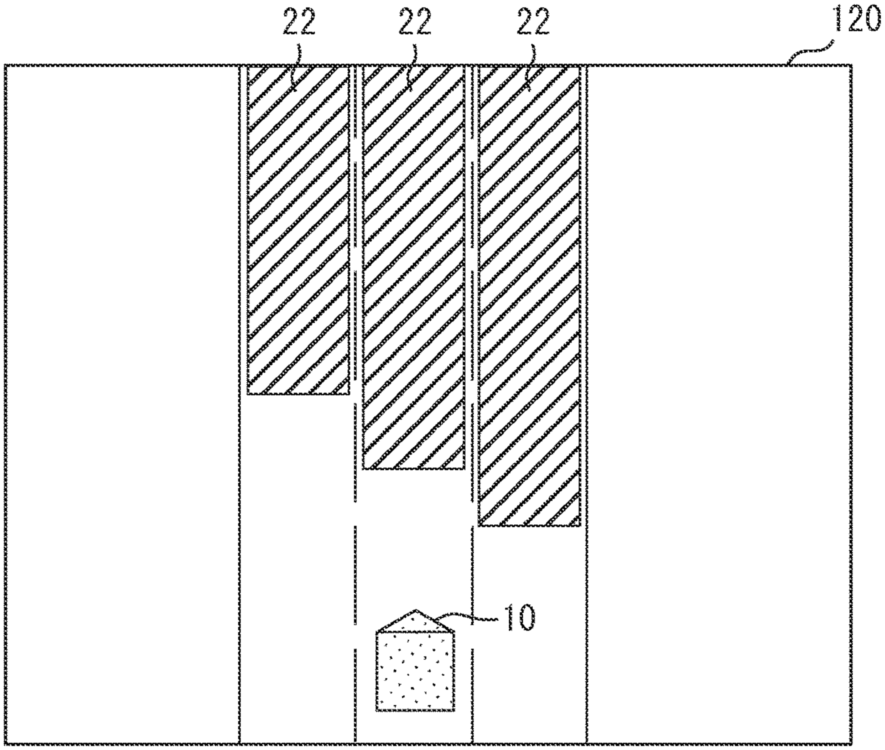
FIG. 24 is an explanatory view collectively showing the other vehicles forming the traffic congestion when displayed in the planer form in a seventh embodiment.
Figure 25:
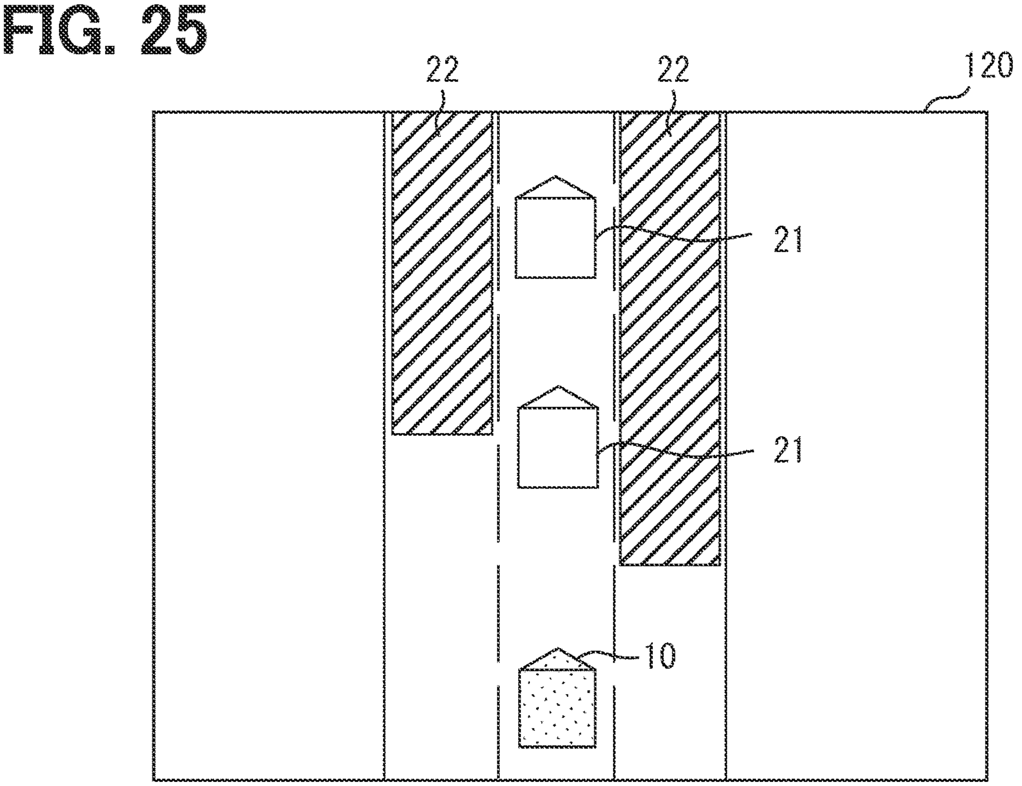
FIG. 25 is an explanatory view collectively showing the other vehicles forming the traffic congestion when displayed in the planer form in the seventh embodiment.
Figure 26:
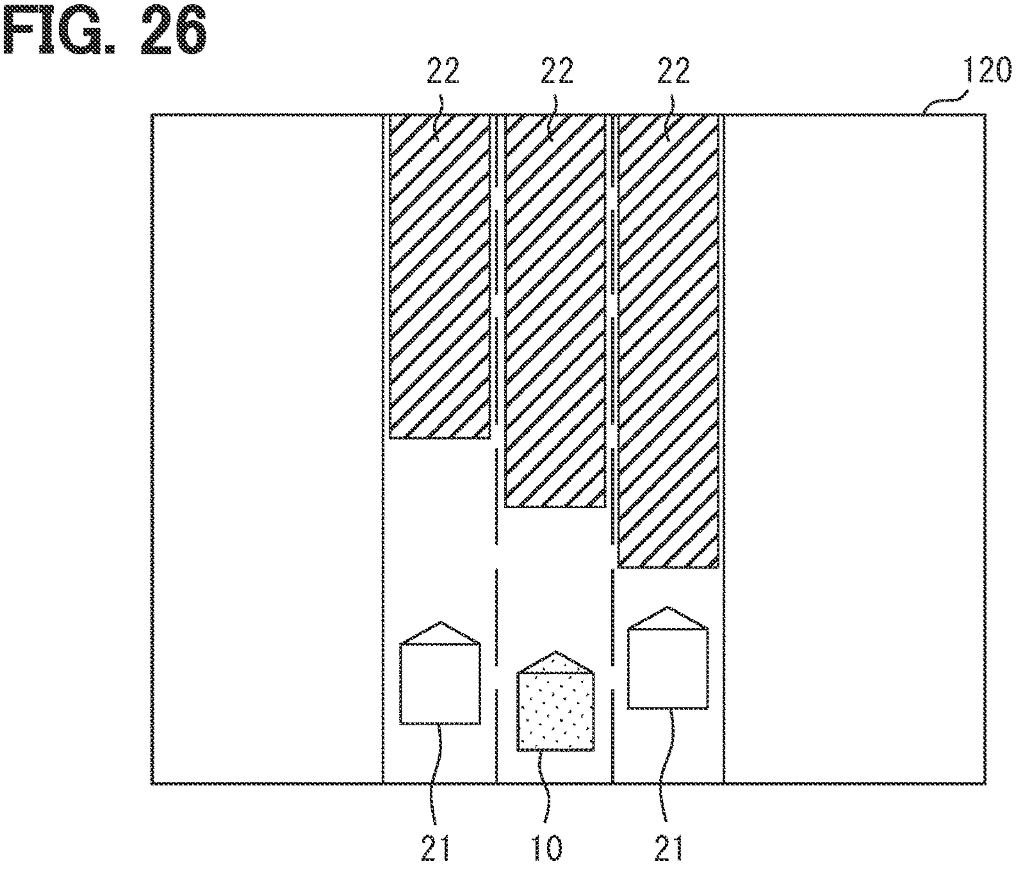
FIG. 26 is an explanatory view collectively showing the other vehicles forming the traffic congestion when displayed in the planer form in the seventh embodiment.

FIG. 24 to FIG. 26 show a seventh embodiment. In the fourth embodiment, the HCU 160 displays, as the transition information, the other vehicles 21 forming the traffic congestion as the traffic congestion region 22 (predetermined cluster).

For example, FIG. 24 shows an example in which all of the other vehicles 21 forming the traffic congestion other than the subject vehicle 10 are displayed as the traffic congestion region 22. Further, in an example shown by FIG. 25, the other vehicles 21 in the traveling lane (subject vehicle lane) of the subject vehicle 10 are individually displayed, and the other vehicles 21 in the other traveling lanes (other vehicle lanes) are displayed as the traffic congestion region 22. Further, in an example shown by FIG. 26, the other vehicles 22 adjacent to the subject vehicle 10 are individually displayed, and the remaining other vehicles 21 are displayed as the traffic congestion region 22.

Thereby, the driver can clearly grasp the traffic congestion situation. The driver can easily grasp which traveling lane enables the transition to the autonomous driving.

Eighth Embodiment

Figure 27:
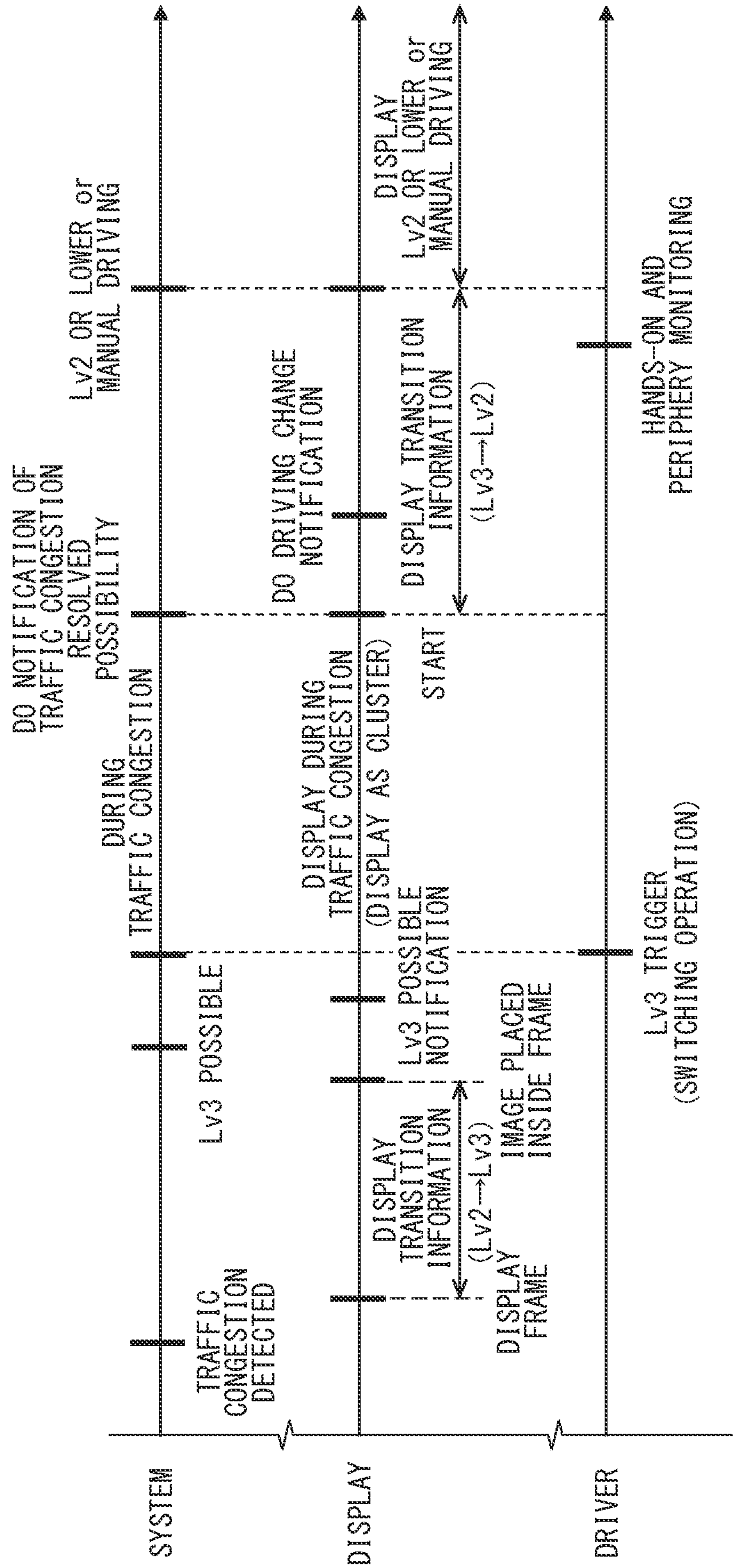
FIG. 27 is a time chart showing a timing of displaying transition information when the traffic congestion is resolved.

FIG. 27 shows an eighth embodiment. In the eighth embodiment, for example, when detecting the possibility (for example, the vehicle speed is 40 km/h or more) of resolving the traffic congestion in the traveling route from the position information of the subject vehicle 10 and the traffic congestion information of the other vehicle 20, the HCU 160 displays transition information corresponding to the traffic congestion resolution on the meter display 120.

That is, when detecting the possibility of resolving the traffic congestion, the HCU 160 displays on the meter display 120, using images of the traveling road, the subject vehicle 10, the other vehicle 20, and the like, transition information (Lv3 to LV2) related to transition from the autonomous driving level 3 or higher (second autonomous driving) to the autonomous driving level 2 or lower (first autonomous driving), until an autonomous driving resolving condition is satisfied.

Note that a point that satisfies the condition for resolving the autonomous driving is a point described as "Lv2 or lower, or manual driving" in FIG. 27. The HCU 160 provides "driving change notification" to the driver after detecting the possibility that the traffic congestion will be resolved. Upon receiving the "driving change notification", the driver performs "hands-on & periphery monitoring" in preparation for autonomous driving level 2 or lower. Further, after the traffic congestion resolving condition is satisfied, the HCU 160 performs "display during autonomous driving level 2 or manual driving".

Thereby, since the driver can clearly recognize the current resolved state of the traffic congestion based on the transition information on the meter display 120, the driver can correctly grasp whether the transition to the first autonomous driving is possible. Hereinafter, a specific example of the transition information corresponding to the traffic congestion resolution will be described.

Ninth Embodiment

Figure 28:
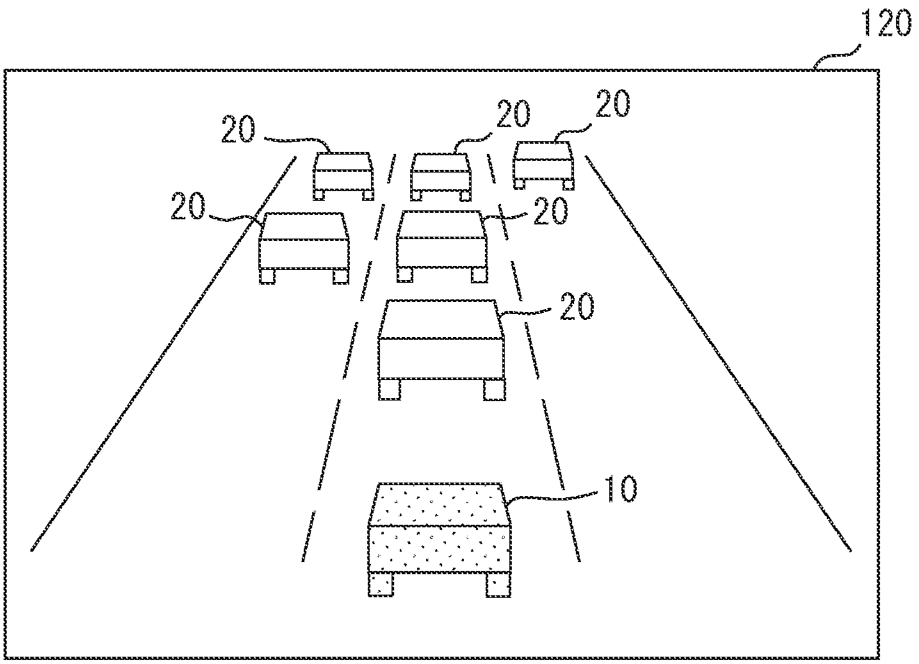
FIG. 28 is an explanatory view showing a ninth embodiment.

FIG. 28 shows a ninth embodiment. In the ninth embodiment, the HCU 160 displays, as the transition information, the subject vehicle 10 and the other vehicle 20 in the bird's-eye view manner. Thereby, the display becomes realistic, and the driver can easily grasp the resolved state of the traffic congestion and the possibility of transition to the autonomous driving level 2 or lower.

First Modification of Ninth Embodiment

Regarding the display of the transition information in FIG. 28 described above, the HCU 160 may switch a height position that becomes a viewpoint for providing the bird's-eye view display to a predetermined position, a higher position than the predetermined position, and an intermediate position between the predetermined position and the higher position, in this order. As the height position corresponding to the viewpoint becomes relatively higher, a farther front position is displayed.

As described above, the height position, which is the viewpoint, is first set to a position higher than the predetermined position, so that the driver can grasp the situation (traffic congestion resolved state) of the other vehicle 20 positioned at a location point far from and in front of the driver. After that, the height position, which is the viewpoint, is switched to the intermediate position, so that the driver can grasp a standard front region.

Second Modification of Ninth Embodiment

The HCU 160 may switch the height position, which is the viewpoint in the above-described bird's-eye view display, each time the vehicle speed of the subject vehicle 10 exceeds a predetermined threshold that is set stepwise. The predetermined threshold can be, for example, 40 km/h, 50 km/h, 60 km/h, and the like. At the vehicle speed of 40 km/h, the HCU 160 sets the height position of the viewpoint in the bird's-eye display to the predetermined position, at the vehicle speed of 50 km/h, sets the height position of the viewpoint to the higher position, and further at the vehicle speed of 60 km/h, sets the height position of the viewpoint to the intermediate position. Thereby, the bird's-eye view display according to the vehicle speed can be provided.

Third Modification of Ninth Embodiment

Figure 29:
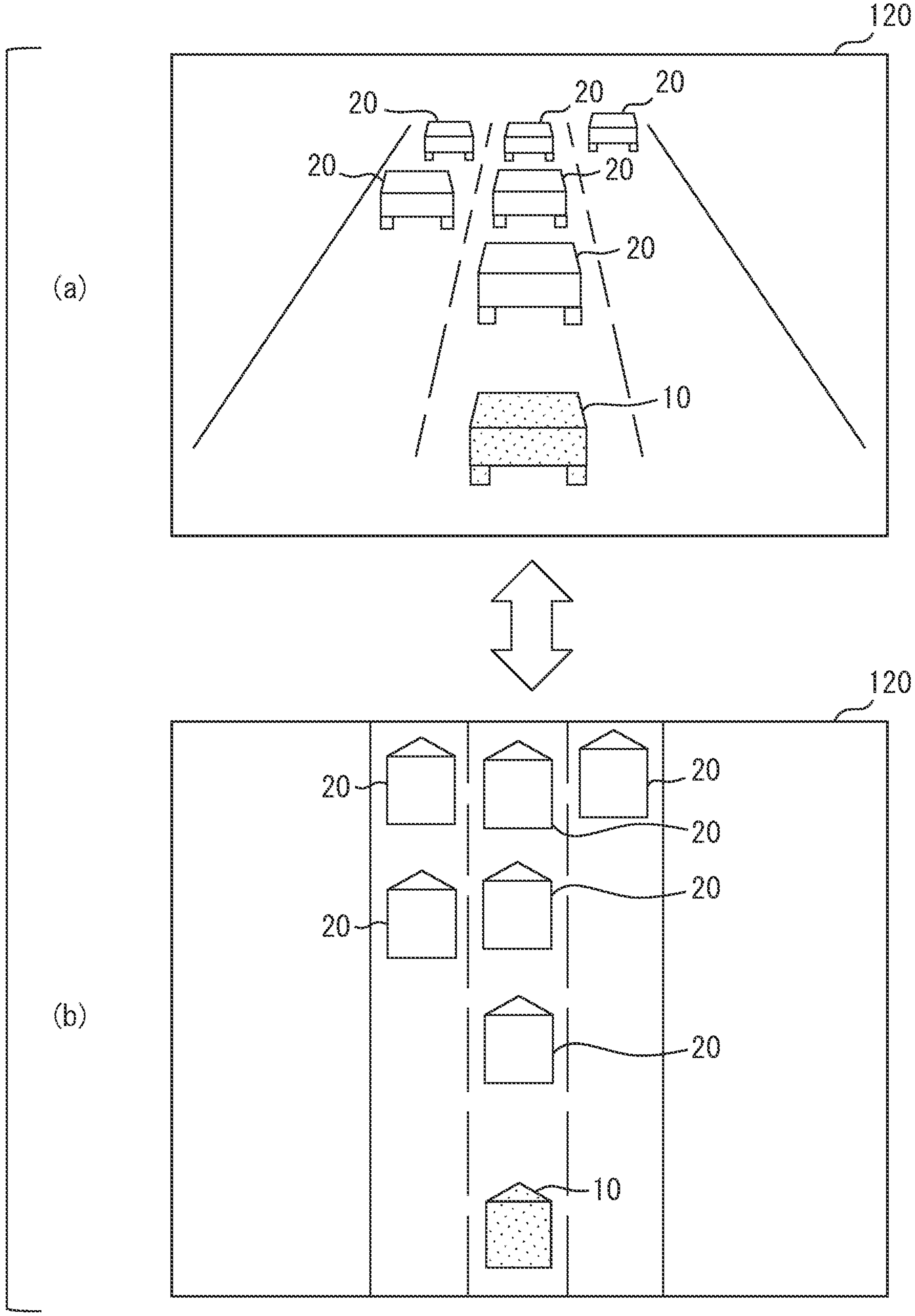
FIG. 29 is an explanatory view showing a first modification of the ninth embodiment.

FIG. 29 shows a third modification of the ninth embodiment. In the third modification of the ninth embodiment, the HCU 160 displays the vehicles 10 and 20 as the transition information, and alternately switches between the bird's-eye view display (in a part (a) of FIG. 29) and the planer view display according to a view from the above (in a part (b) of FIG. 29). The bird's-eye display makes it easy to grasp the front and far situation of the subject vehicle 10, and the planer display makes it easy to grasp the surroundings of the subject vehicle 10.

Tenth Embodiment

Figure 30:
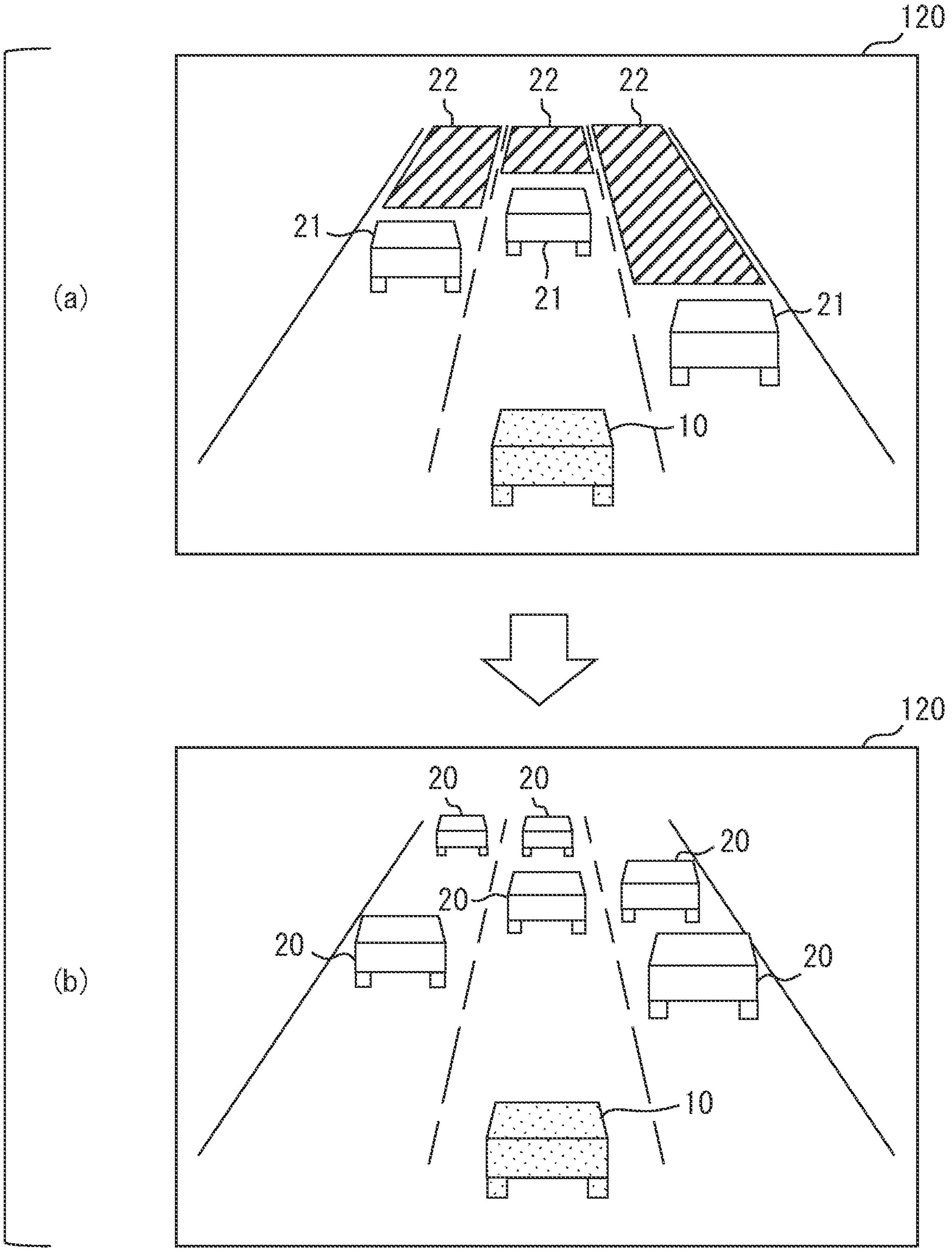
FIG. 30 is an explanatory view showing a tenth embodiment.

FIG. 30 shows a tenth embodiment. In the tenth embodiment, the HCU 160 displays the other vehicles 20 as the traffic congestion region 22 (cluster) during the traffic congestion. The HCU 160 switches a display of the traffic congestion region 22 to a display showing each other vehicle 20, as the transition information when the traffic congestion is resolved. In this way, the display showing each of the other vehicles 20 allows the driver to appropriately grasp how the traffic congestion is resolved.

First Modification of Tenth Embodiment

In a first modification of the tenth embodiment described above, the HCU 160 may perform the switching from the display of the traffic congestion region 22 (cluster display) to the display showing each of the other vehicles 20, depending on an inter-vehicle distance between the subject vehicle 10 and the front other vehicle 20, or an increase change of the vehicle speed of the subject vehicle 10. Thereby, it is possible to more appropriately grasp how the traffic congestion is resolved.

Eleventh Embodiment

Figure 31:
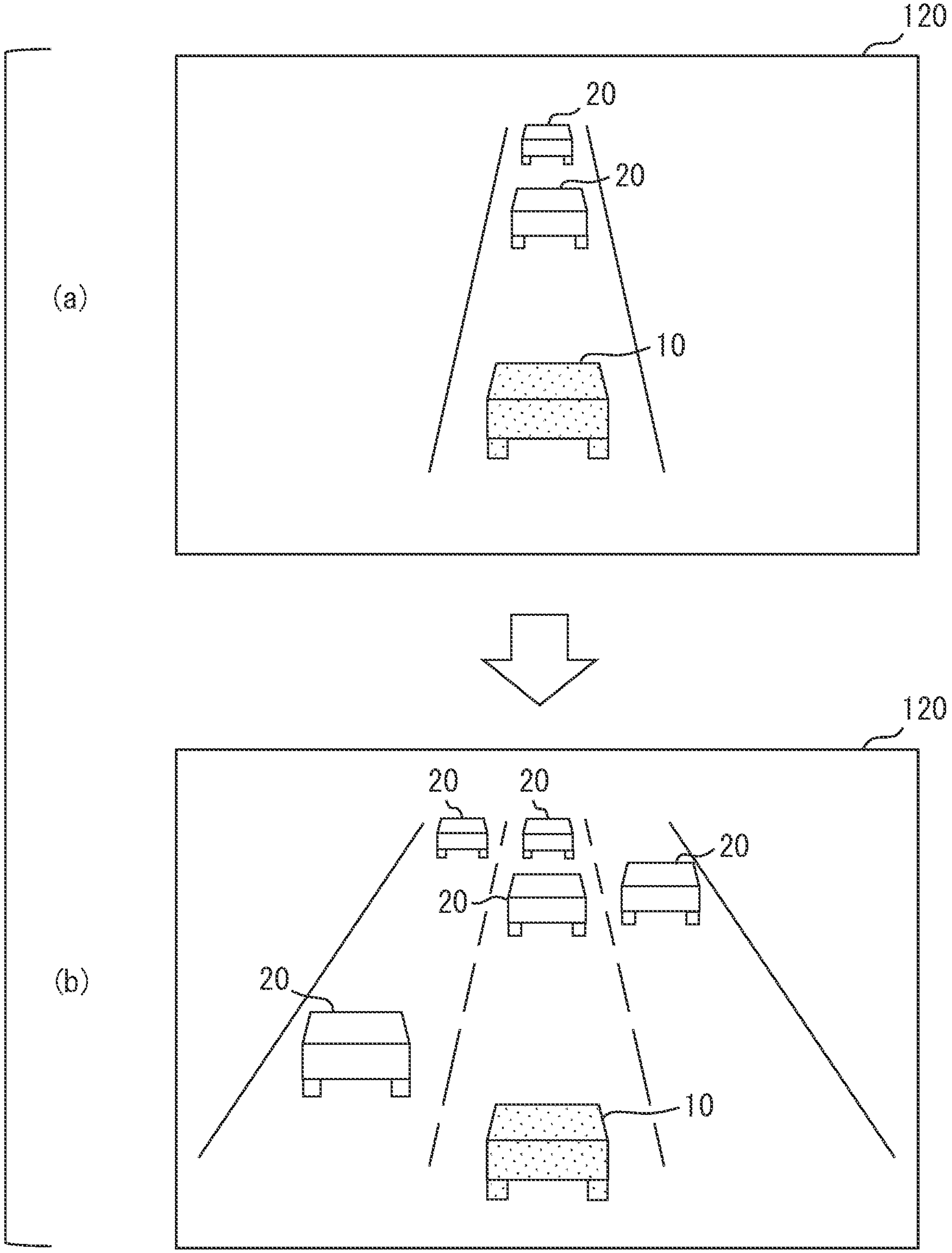
FIG. 31 is an explanatory view showing an eleventh embodiment.

FIG. 31 shows an eleventh embodiment. In the eleventh embodiment, the HCU 160 displays only the traveling lane of the subject vehicle 10 during the traffic congestion. The HCU 160 switches the display to display including the peripheral traveling lanes (peripheral vehicle lanes) as the transition information when the traffic congestion is resolved. Thereby, the driver can appropriately grasp the traffic congestion resolved situation including surrounding driving lanes.

Twelfth Embodiment

Figure 32:
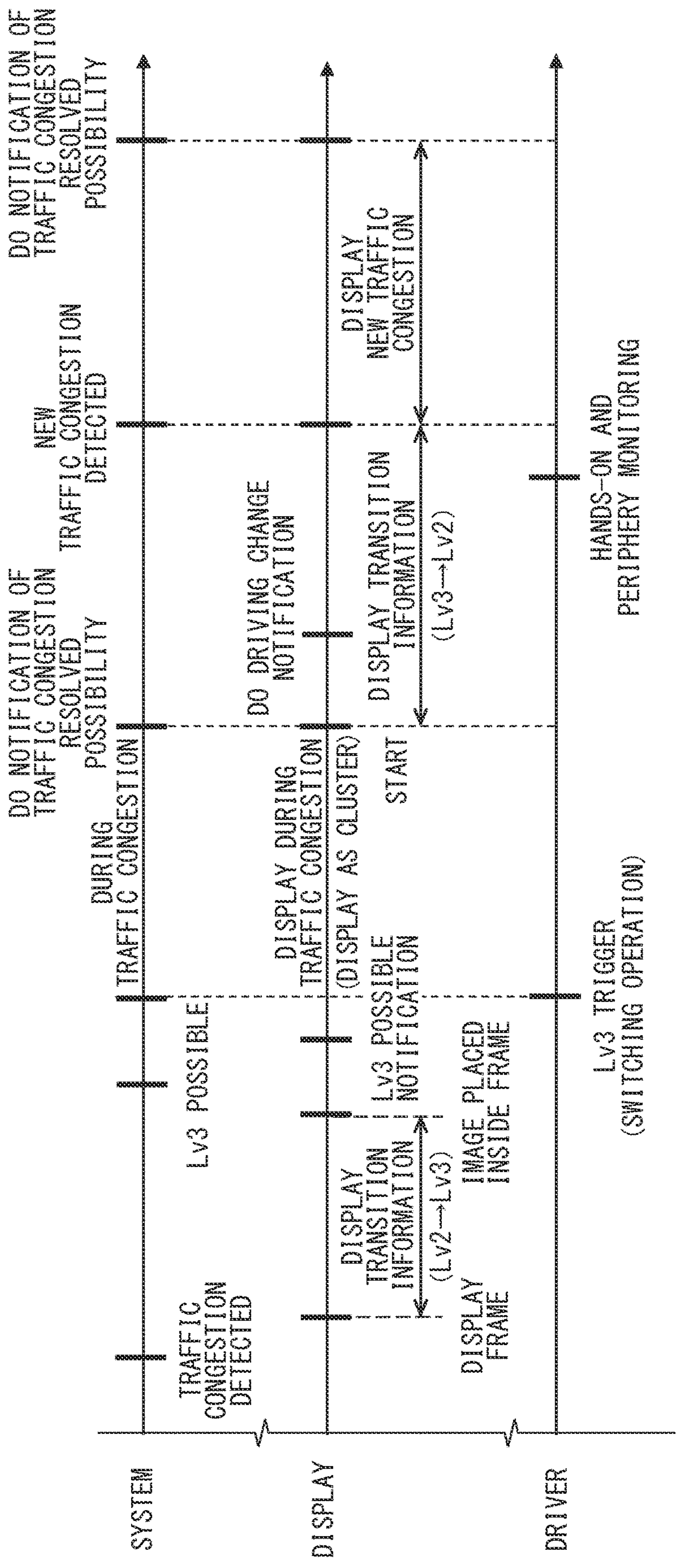
FIG. 32 is a time chart showing a timing of displaying transition information when the traffic congestion occurs again after the traffic congestion is resolved.
Figure 33:
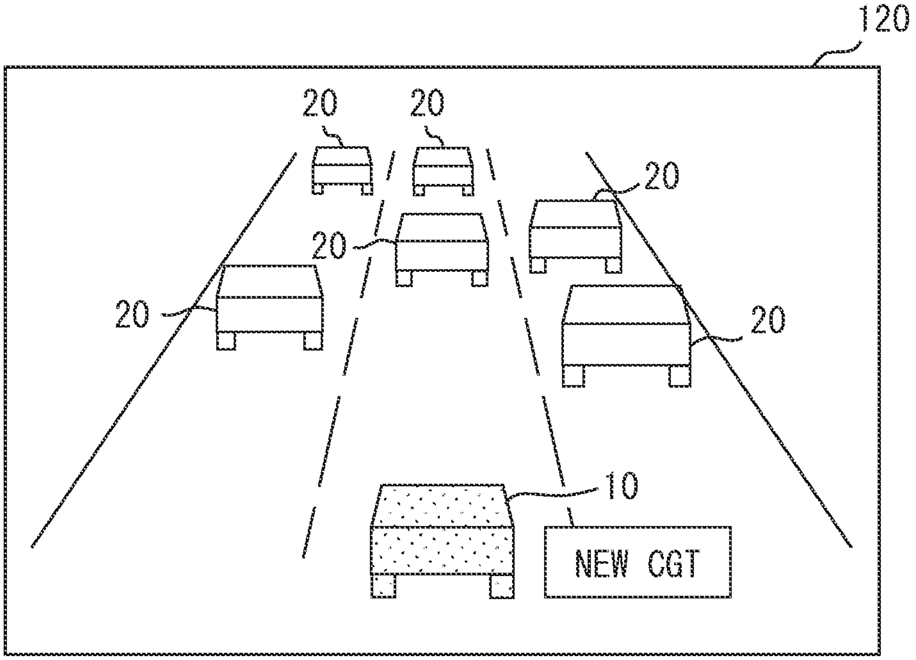
FIG. 33 is an explanatory view showing a twelfth embodiment.

FIGS. 32 and 33 show a twelfth embodiment. In the twelfth embodiment, as shown in FIG. 32, when, after the traffic congestion is resolved, the traffic congestion occurs again, the HCU 160 displays a message indicating that the traffic congestion, which has occurred again, is different from the previously occurred traffic congestion (in other words, perform a display of new traffic congestion). The new traffic congestion display is, for example, as shown in FIG. 33 is a display in which characters of "new traffic congestion" is placed near the subject vehicle 10. The characters may be changed. Further, in the drawings, the new traffic congestion may be also referred to as "NEW CGT". Thereby, the driver can distinguish and recognize the previous traffic congestion and the new traffic congestion after the previous traffic congestion is resolved.

Thirteenth Embodiment

Figure 34:
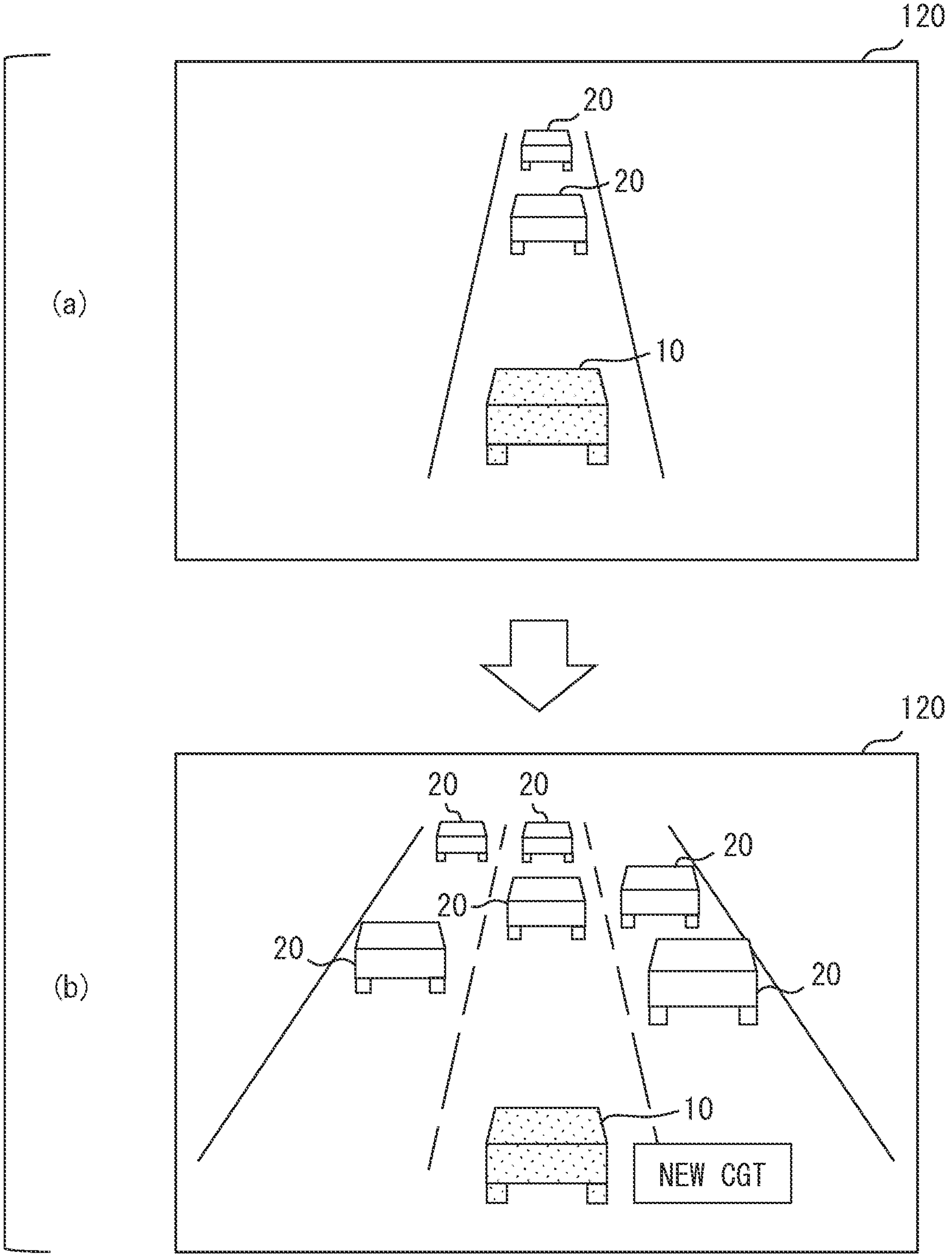
FIG. 34 is an explanatory view showing a thirteenth embodiment.

FIG. 34 shows a thirteenth embodiment. In the thirteenth embodiment, the HCU 160 displays only the traveling lane of the subject vehicle 10 during the traffic congestion. The HCU 160 switches the display to a display including the peripheral traveling lanes (peripheral vehicle lanes) when the new traffic congestion occurs. At this time, the HCU 160 prohibits returning to the display showing only the traveling lane of the subject vehicle 10. Thereby, the driver can clearly grasp that the new traffic congestion is different from the previous traffic congestion.

First Modification of Thirteenth Embodiment

In a first modification of the thirteenth embodiment, the HCU 160 performs, during the traffic congestion, a display including the peripheral traveling lanes (peripheral vehicle lanes), and performs a display including the subject vehicle 10 and the other vehicle 20 in the bird's-eye view form of which viewpoint is at the predetermined height position. Then, when the congestion has been resolved and the traffic congestion reoccurs, the display including the peripheral traveling lanes is presented, and the height position that is the viewpoint for the bird's-eye display may be switched to a position higher than the predetermined height position. Further, the position may be switched to a position lower than the predetermined position. By switching the height position, which is the viewpoint for the bird's-eye view display, to a position higher than the predetermined height position, the driver can appropriately grasp a farther front position in the new traffic congestion. Further, the height position, which is the viewpoint, is switched to the intermediate position, so that the driver can grasp a standard front region.

Fourteenth Embodiment

Figure 35:
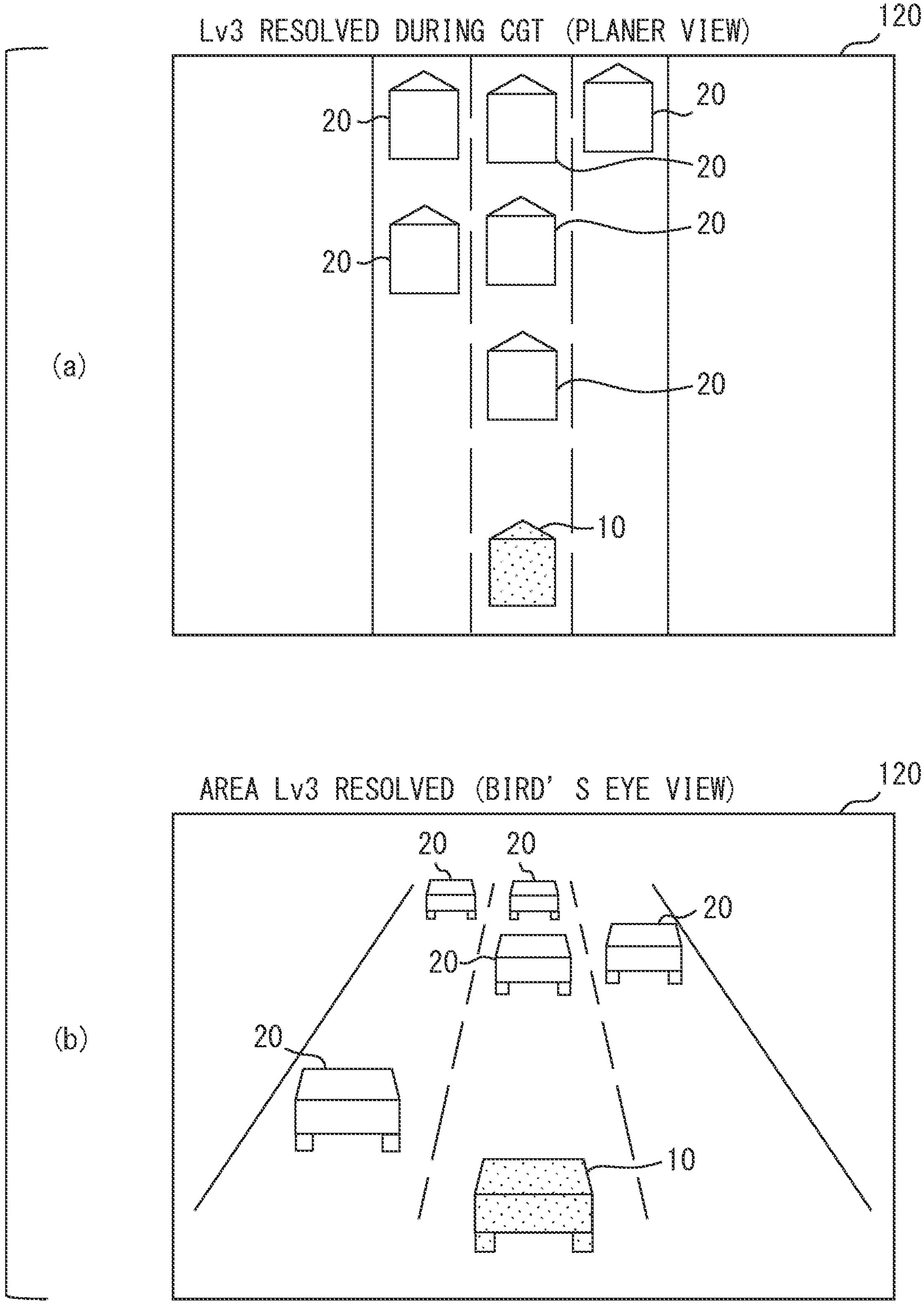
FIG. 35 is an explanatory view showing a fourteenth embodiment.

FIG. 35 shows a fourteenth embodiment. In the fourteenth embodiment, the HCU 160 changes the content of the transition information, depending on a case where the second autonomous driving is at the autonomous driving level 3 or higher due to the traffic congestion or, for example, a case where the second autonomous driving is the autonomous driving level 3 or higher due to the traffic congestion in a predetermined road such as highway.

Specifically, the HCU 160 displays the subject vehicle 10 and the other vehicle 20 in the planer form (a part (a) of FIG. 35) when the second autonomous driving of the autonomous driving level 3 or higher due to the traffic congestion is resolved. The HCU 160 displays the subject vehicle 10 and the other vehicle 20 in the bird's-eye view form (a part (b) of FIG. 35) when the second autonomous driving of the autonomous driving level 3 or higher due to the traffic congestion in the predetermined road is resolved. Thereby, when the autonomous driving level 3 or higher due to the traffic congestion is resolved, the speed of the subject vehicle 10 is relatively low and the display is provided in the planer form. As the result, it is possible to grasp the situation of the other vehicles 20 in the periphery of the subject vehicle 10. Further, when the autonomous driving level 3 or higher due to the traffic congestion in the predetermined road is resolved, the speed of the subject vehicle 10 is relatively high and the display is provided in the bird's eye-view form. As the result, it is possible to grasp the situation other vehicles 20 far from and in front of the subject vehicle 10.

First Modification of Fourteenth Embodiment

Figure 36:
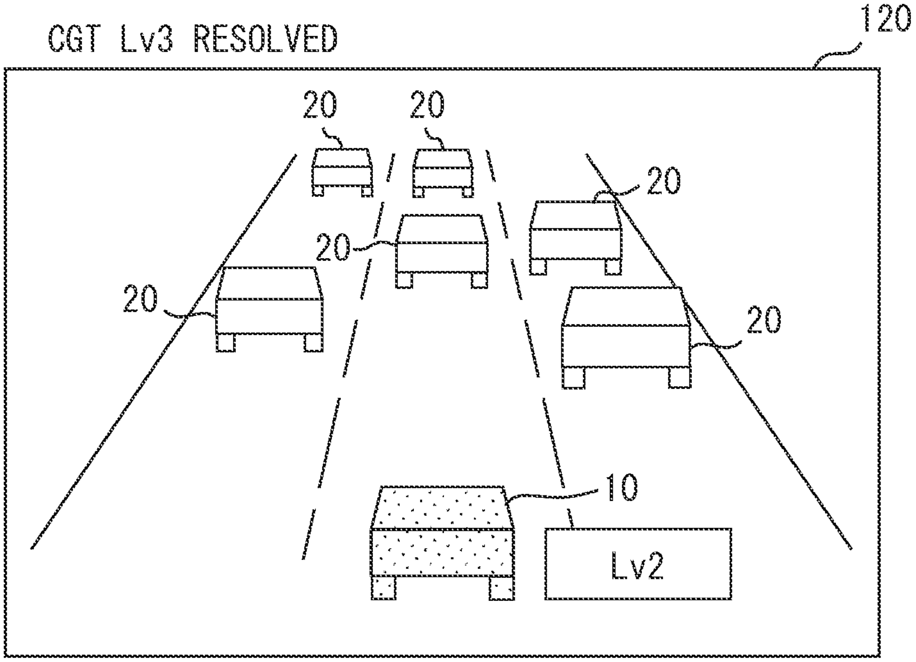
FIG. 36 is an explanatory view showing a first modification of the fourteenth embodiment.
Figure 36:
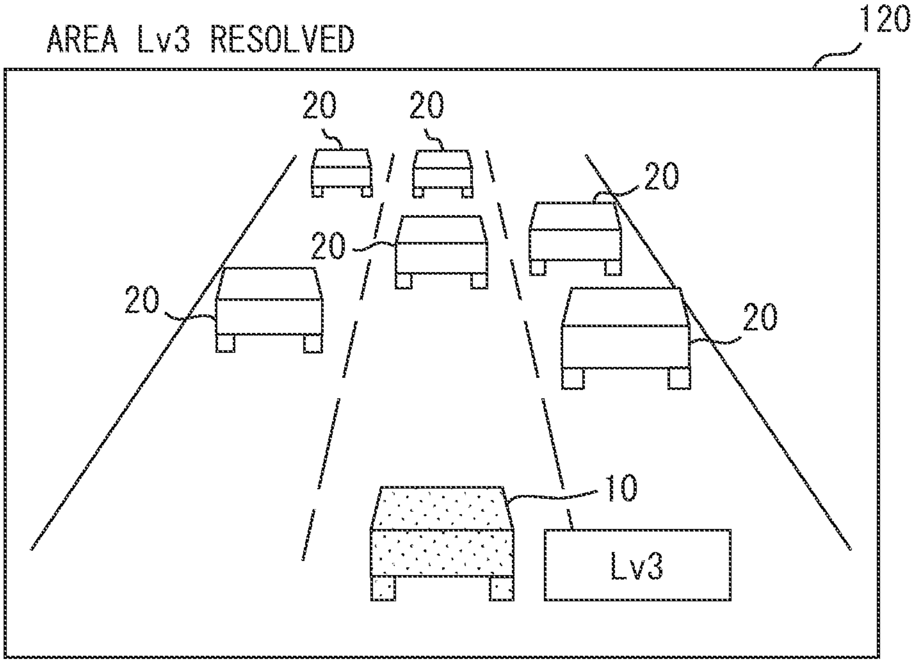
Figure 37:
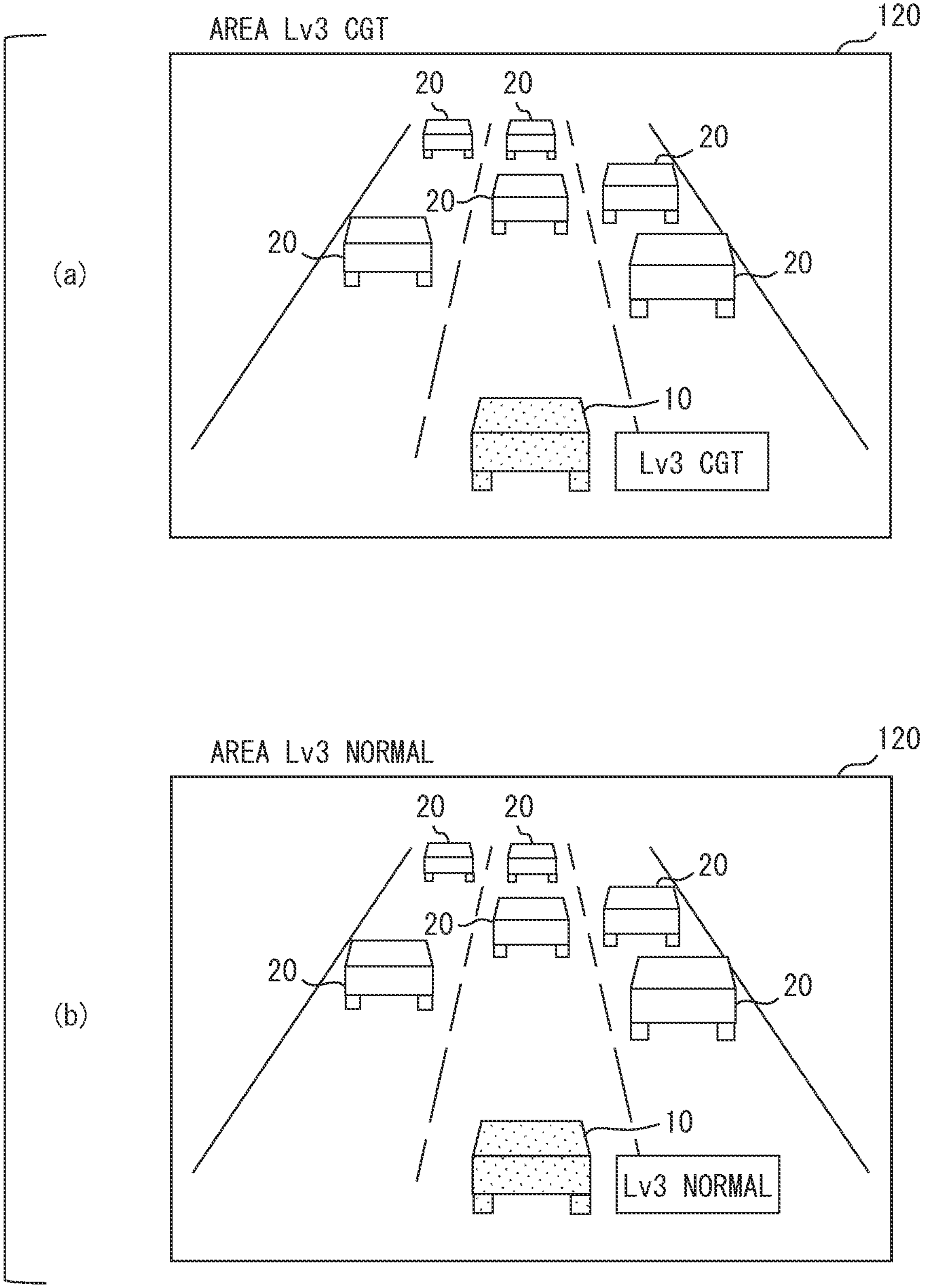
FIG. 37 is an explanatory view showing a second modification of the fourteenth embodiment.

FIGS. 36 and 37 show a first modification of the fourteenth embodiment. In the first modification of the fourteenth embodiment, the HCU 160 displays an icon indicating that the subject vehicle 10 is at the autonomous driving level 2 or lower when the second autonomous driving of the autonomous driving level 3 or higher due to the traffic congestion is resolved ("Lv2" in a part (a) of FIG. 36). Further, the HCU 160 displays an icon indicating that the autonomous driving level 3 of the subject vehicle 10 has continued when the second autonomous driving of the autonomous driving level 3 or higher during the traffic congestion on the predetermined road is resolved ("Lv3" in a part (b) of FIG. 36). Alternatively, the HCU 160 changes the mode of the icon between a case where the predetermined road is congested ("Lv3 Traffic Congestion" in a part (a) of FIG. 37) and a case of a normal state on the predetermined road ("Lv3 Normal" in a part (b) of FIG. 37).

As a result, in FIG. 36, the driver can appropriately distinguish a case where the autonomous driving level 3 or higher due to the traffic congestion is resolved and a case where the autonomous driving level 3 or higher due to the traffic congestion on a predetermined road is resolved. Further, in FIG. 37, the driver can appropriately distinguish the case of the traffic congestion on the predetermined road and the case of the normal state on the predetermined road.

Fifteenth Embodiment

Figure 38:
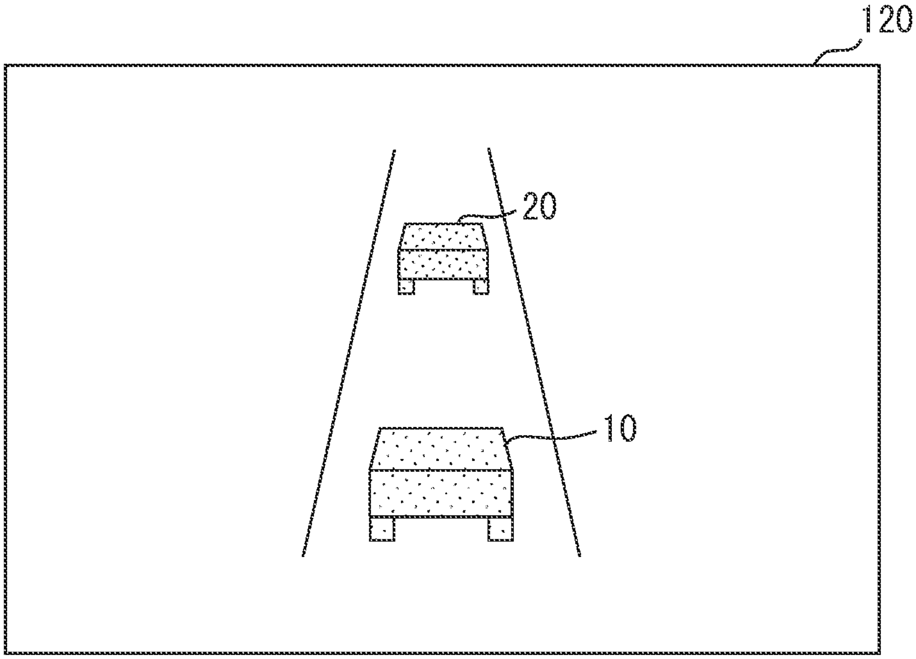
FIG. 38 is an explanatory view showing a fifteenth embodiment.

A fifteenth embodiment is shown in FIG. 38. In the fifteenth embodiment, the HCU 160 changes the display form of the front other vehicle 20 in a case where the vehicle speed of the front other vehicle 20 exceeds a resolving vehicle speed (for example, 50 km/h) that is a condition for resolving the traffic congestion, when the traffic congestion is resolved. The HCU 160 changes the color of the other vehicle 20, for example. Thereby, the driver can appropriately grasp the timing for resolving the traffic congestion based on the display form of the front other vehicle 20.

Other Embodiments

In each of the above-described embodiments, detection of the traffic congestion is determined based on VICS information, for example, but determination may be made based on two or more conditions. When the possibility of traffic congestion is clearly low, the information becomes unnecessary for the driver. Therefore, by using multiple determination conditions, it is possible to improve the reliability of traffic congestion determination.

For example, the traffic congestion may be detected from not only the VICS information but also the vehicle speed sensor. Also, when the vehicle speed is equal to or less than a predetermined value (for example, 10 km/h or less), there is no other vehicle 20 blocking the front, the left, and the right sides of the subject vehicle 10 in multiple traveling lanes. Therefore, when the autonomous driving level 3 does not become possible, the transition information may be displayed.

Further, when the other vehicle 20 is the same for a certain period of time when the traffic congestion is detected, it may be preferable to determine that there is the occurrence of the traffic congestion and execute each of the above-described embodiments. This is because, for example, even when the other vehicle 20 exists in front of the subject vehicle 10 for a long time and there is a flow of other vehicles 20 in turn, it is preferable not to determine that there is the traffic congestion.

Further, when the traffic congestion is detected and the other vehicles 20 are displayed on the meter display 120, many other vehicles 20 may overlap each other, so that it becomes difficult to visually recognize the congested area. As a method of expressing the other vehicles 20 in such a case, the visibility of the traffic congestion area can be improved by, for example, increasing the transparency.

Further, in the case of using information on the traveling lane (lane identifier) as information for determining the occurrence of traffic congestion, coordinates data of the other vehicle 20 may be added, and the congested area may be estimated.

Further, although, in each of the above-described embodiments, the display unit is the meter display 120, the display unit is not limited to this, and another HUD 110 or CID 130 may be used as the display unit. When the CID 130 is used as the display unit, the CID 130 can implement a display related to the autonomous driving and an operation (touch operation) for switching to the autonomous driving.

Further, the CID 130 may be formed of, for example, multiple CIDs, and may be a pillar-to-pillar type display unit in which the meter display 120 and the multiple CIDs are arranged in a horizontal row on the instrument panel.

The disclosure in the present specification and drawings is not limited to the exemplified embodiments. The present disclosure includes embodiments described above and modifications of the above-described embodiments made by a person skilled in the art. For example, the present disclosure is not limited to a combination of the components and/or elements described in the embodiments. The present disclosure may be executed by various different combinations. The present disclosure may include additional configuration that can be added to the above-described embodiments. The present disclosure also includes modifications which include partial components/elements of the above-described embodiments. The present disclosure includes replacements of components and/or elements between one embodiment and another embodiment, or combinations of components and/or elements between one embodiment and another embodiment The disclosed technical scope is not limited to the description of the embodiment. It should be understood that some disclosed technical ranges are indicated by description of claims, and includes every modification within the equivalent meaning and the scope of description of claims.

The controller and the techniques thereof according to the present disclosure may be implemented by one or more special-purposed computers. Such a special-purposed computer may be provided by configuring a processor and a memory programmed to execute one or more functions embodied by a computer program.

Alternatively, each control unit and the like, and each method thereof described in the present disclosure may be implemented by a dedicated computer provided by including a processor with one or more dedicated hardware logic circuits.

Alternatively, the control unit and the like and the method thereof described in the present disclosure may be achieved by one or more dedicated computers constituted by a combination of a processor and a memory programmed to execute one or a plurality of functions and a processor constituted by one or more hardware logic circuits.

The computer program may be stored in a computer readable non-transitory tangible storage medium as computer-executable instructions.

The invention claimed is:

1. A vehicle display apparatus comprising:

a display configured to display traveling information of a vehicle;

a processor and memory configured to acquire position information of the vehicle and traffic congestion information related to a plurality of other vehicles that travel in a periphery of the vehicle; and a display controller configured to:

detect an occurrence of traffic congestion from the position information and the traffic congestion information related to the plurality of other vehicles, upon detecting the occurrence, determine a period from detection of the occurrence to a time when a predetermined autonomous driving possible condition is satisfied, and display, on the display, transition information related to a transition to autonomous driving by using an image of at least one of a traveling road or the plurality of other vehicles during the determined period, wherein:

the display controller is configured to:

display, as the transition information, a predetermined other vehicle area in the periphery of the vehicle, determine whether autonomous driving is possible when at least one of the plurality of other vehicles enters the other vehicle area, upon detecting the occurrence of the traffic congestion, display the other vehicle area as a broken-line frame as the transition information, display an image indicating the other vehicle in the broken-line frame after displaying the broken-line frame, and change a display of the other vehicle area to a solid-line frame between a time after the broken-line frame is displayed and a time when it is determined that the autonomous driving is possible, when the predetermined autonomous driving possible condition is satisfied, the processor executes autonomous driving at a predetermined autonomous driving level that controls traveling of the vehicle to follow at least one of the plurality of other vehicles and does not require periphery monitoring duty, and the predetermined autonomous driving possible condition is that a vehicle speed of the vehicle is 10 km/hour or less.

2. A vehicle display apparatus comprising:

a display configured to display traveling information of a vehicle;

a processor and memory configured to acquire position information of the vehicle and traffic congestion information related to a plurality of other vehicles that travel in a periphery of the vehicle; and a display controller configured to:

detect an occurrence of traffic congestion from the position information and the traffic congestion information related to the plurality of other vehicles, upon detecting the occurrence, determine a period from detection of the occurrence to a time when a predetermined autonomous driving possible condition is satisfied, and display, on the display, transition information related to a transition to autonomous driving by using an image of at least one of a traveling road or the plurality of other vehicles during the determined period, wherein:

the display controller is configured to display, as the transition information, a possible area where the autonomous driving is possible and display, the possible area being displayed at a position on the traveling road where the plurality of the other vehicles do not exist, when the predetermined autonomous driving possible condition is satisfied, the processor executes autonomous driving at a predetermined autonomous driving level that controls traveling of the vehicle to follow at least one of the plurality of other vehicles and does not require periphery monitoring duty, the predetermined autonomous driving possible condition is that a vehicle speed of the vehicle is 10 km/hour or less, and the possible area is located between the vehicle and, among the plurality of other vehicles, an other vehicle closest to the vehicle in a traveling direction of the vehicle in an adjacent lane adjacent to a lane in which the vehicle travels, and the possible area is formed such that the possible area is surrounded, on a forward side, a left side, and a right side of the possible area, by a combination of the other vehicle and a road shoulder based on the traveling direction.

3. The vehicle display apparatus according to claim 2, wherein the possible area is a position of the vehicle to follow the other vehicle.

4. The vehicle display apparatus according to claim 2, wherein:

the possible area is a traveling vehicle lane to follow the other vehicle.

5. A vehicle display apparatus comprising:

a display configured to display traveling information of a vehicle;

a processor and memory configured to acquire position information of the vehicle and traffic congestion information related to a plurality of other vehicles that travel in a periphery of the vehicle; and a display controller configured to:

detect an occurrence of traffic congestion from the position information and the traffic congestion information related to the plurality of other vehicles, upon detecting the occurrence, determine a period from detection of the occurrence to a time when a predetermined autonomous driving possible condition is satisfied, and display, on the display, transition information related to a transition to autonomous driving by using an image of at least one of a traveling road or the plurality of other vehicles during the determined period, wherein:

the display controller is configured to display, as the transition information, the plurality of other vehicles that form the traffic congestion as a cluster and to exclude an other vehicle of the plurality of other vehicles on a tail from the displayed cluster, and to display the other vehicle on the tail individually and separately from the displayed cluster, the other vehicle on the tail being, among the plurality of other vehicles existing in front of the vehicle, closest to the vehicle in a lane of the traveling road in a traveling direction of the vehicle, and within the cluster, and the cluster is displayed such that a vehicle image is not individually displayed for any of the plurality of other vehicles that form the traffic congestion, when the predetermined autonomous driving possible condition is satisfied, the processor executes autonomous driving at a predetermined autonomous driving level that controls traveling of the vehicle to follow at least one of the plurality of other vehicles and does not require periphery monitoring duty, and the predetermined autonomous driving possible condition is that a vehicle speed of the vehicle is 10 km/hour or less.

6. A vehicle display apparatus comprising:

a display configured to display traveling information of a vehicle;

a processor and memory configured to acquire position information of the vehicle and traffic congestion information related to a plurality of other vehicles that travel in a periphery of the vehicle; and a display controller configured to:

detect an occurrence of traffic congestion from the position information and the traffic congestion information related to the plurality of other vehicles, upon detecting the occurrence, determine a period from detection of the occurrence to a time when a predetermined autonomous driving possible condition is satisfied, and display, on the display, transition information related to a transition to autonomous driving by using an image of at least one of a traveling road or the plurality of other vehicles during the determined period, wherein:

the display controller is configured to display, as the transition information, an impossible area where the autonomous driving is impossible, the impossible area being displayed at a position on the traveling road where the plurality of the other vehicles do not exist, when the predetermined autonomous driving possible condition is satisfied, the processor executes autonomous driving at a predetermined autonomous driving level that controls traveling of the vehicle to follow at least one of the plurality of other vehicles and does not require periphery monitoring duty, the predetermined autonomous driving possible condition is that a vehicle speed of the vehicle is 10 km/hour or less, and the impossible area is located between the vehicle and, among the plurality of other vehicles, an other vehicle in a traveling direction of the vehicle, and the other vehicle and a road shoulder do not exist in adjacent lanes located on a left side and a right side of the impossible area.

* * * * *